United States Patent [19]

Yoshikawa et al.

[11] Patent Number: 5,801,869
[45] Date of Patent: Sep. 1, 1998

[54] OPTICAL SCANNER, IMAGE FORMING APPARATUS AND IMAGE READING APPARATUS

[75] Inventors: Motonobu Yoshikawa; Yoshiharu Yamamoto; Kazutake Boku, all of Osaka, Japan

[73] Assignee: Matsushita Electric Industrial Co., Ltd., Osaka, Japan

[21] Appl. No.: 884,116

[22] Filed: Jun. 27, 1997

Related U.S. Application Data

[62] Division of Ser. No. 604,058, Feb. 20, 1996, Pat. No. 5,751,464.

[30] Foreign Application Priority Data

Feb. 20, 1995 [JP] Japan ................................ 7-031065

[51] Int. Cl.[6] ................................................ G02B 26/08
[52] U.S. Cl. ........................ 359/208; 359/204; 359/216; 250/236
[58] Field of Search ............................ 359/205, 204, 359/208, 216, 217, 218, 219; 250/234, 235, 236

[56] References Cited

U.S. PATENT DOCUMENTS

| | | | |
|---|---|---|---|
| 4,629,283 | 12/1986 | Plaot | 359/208 |
| 4,690,485 | 9/1987 | Plaot | 359/208 |
| 4,912,321 | 3/1990 | Cooper | 250/236 |
| 4,941,719 | 7/1990 | Hisada et al. | |
| 5,013,108 | 5/1991 | Van Amstel | 359/218 |
| 5,220,449 | 6/1993 | Kuroda | 359/208 |
| 5,353,047 | 10/1994 | Nakamura et al. | |
| 5,373,390 | 12/1994 | Sakuma | 359/208 |
| 5,408,095 | 4/1995 | Atsuumi et al. | 250/236 |

FOREIGN PATENT DOCUMENTS

| | | |
|---|---|---|
| 60-257417 | 12/1985 | Japan . |
| 60-257418 | 12/1985 | Japan . |
| 4-245214 | 9/1992 | Japan . |
| WO 82/0295 | 9/1982 | WIPO . |

*Primary Examiner*—Loha Ben
*Attorney, Agent, or Firm*—Merchant, Gould, Smith, Edell, Welter & Schmidt, P.A.

[57] ABSTRACT

An optical scanner comprising a light source unit, an optical deflector to scan a light beam from the light source unit, a first image formation optical system disposed between the light source unit and the optical deflector, and a second image formation optical system disposed between the optical deflector and the surface to be scanned, wherein the second image formation optical system comprises a first curved mirror to reflect the light beam from the optical deflector and a second curved mirror to focus the light beam from the first curved mirror on the surface to be scanned, having surface shapes of any of the group consisting of the first curved mirror having a toric surface with a convex shape in the main scanning direction, which is the direction a light beam is scanned in, and with a concave shape in the sub scanning direction, which is the direction perpendicular to the main scanning direction, and the first curved mirror having a toric surface with a concave shape in the main scanning direction and a convex shape in the sub scanning direction and a second curved mirror having a toric surface or cylindrical surface without a refractive power or with a concave shape in the main scanning direction, and with a concave shape in the sub scanning direction to focus the light beam from the first curved mirror on the surface to be scanned.

24 Claims, 23 Drawing Sheets main scanning direction sub scanning direction

OPTICAL SCANNER, IMAGE FORMING APPARATUS AND IMAGE READING APPARATUS

This is a Divisional of application Ser. No. 08/604,058, filed Feb. 20, 1996, now U.S. Pat. No. 5,751,464, issued May 12, 1998, which application(s) are incorporated herein by reference.

BACKGROUND OF THE INVENTION

1. Field of the Invention

The present invention relates to an optical scanner, which can be used in laser beam printers, laser facsimiles, digital document copiers, and the like.

2. Description of the Prior Art

Generally, a conventional optical scanner used in a laser beam printer comprises a semiconductor laser as a light source, a first image formation optical system to focus linearly a light beam from the light source on an optical deflector so as to compensate for the tilt of the deflection surface of the optical deflector, a polygon mirror as the optical deflector, and a second image formation optical system to form a uniform spot at a same speed on a surface to be scanned.

Although a conventional second image formation optical system comprises a plurality of large glass lenses called an fθ lens, there have been problems such as high cost and the difficulty in downsizing. Therefore, in order to realize downsizing and a lower cost, optical scanners with a second image formation optical system comprising a convex first spheric mirror and a concave second spheric mirror as disclosed in JP-A-4-245214, or a concave spheric mirror and a cylindrical mirror as disclosed in JP-A-60-257417 have been advocated.

However, these optical systems have problems such as difficulty in achieving a high resolution due to insufficient compensation of the curvature of field and fθ.

SUMMARY OF THE INVENTION

An object of the present invention is to provide an optical scanner with a compact structure and with a lower cost as well as a high resolution in view of the above mentioned conventional problems.

In order to solve the above mentioned problems, a first aspest of the optical scanner of the present invention comprises a light source unit, an optical deflector to scan a light beam from the light source unit, a first image formation optical system disposed between the light source unit and the optical deflector, and a second image formation optical system disposed between the optical deflector and a surface to be scanned. The second image formation optical system comprises a first curved mirror to reflect the light beam from the optical deflector and a second curved mirror having a toric surface with a convex shape in the main scanning direction, which is the direction a light beam is scanned in, and a concave shape in the sub scanning direction, which is the direction perpendicular to the main scanning direction, to focus the light beam from the first curved mirror on the surface to be scanned.

A second aspect of the optical scanner of the present invention comprises a light source unit, an optical deflector to scan a light beam from the light source unit, a first image formation optical system disposed between the light source unit and the optical deflector, and a second image formation optical system disposed between the optical deflector and the surface to be scanned. The second image formation optical system comprises a first curved mirror having a toric surface with a concave shape in the main scanning direction, which is the direction a light beam is scanned in, and a convex shape in the sub scanning direction, which is the direction perpendicular to the main scanning direction, to reflect the light beam from the optical deflector, and a second curved mirror having a toric surface or cylindrical surface without a refractive power or with a concave shape in the main scanning direction and a concave shape in the sub scanning direction to focus the light beam from the first curved mirror on a surface to be scanned.

In the above mentioned first or second aspect, it is preferable that the second curved mirror has a toric surface of which refractive power in the sub scanning direction changes in the vicinity of the center portion in the main scanning direction.

In the above mentioned first aspect, it is preferable that by rotating a circular arc existing in a plane including the optical axis and parallel to the main scanning direction about the rotation symmetrical axis existing in the plane including the optical axis and parallel to the main scanning direction.

Alternatively, in the above mentioned first aspect, it is preferable that the second curved mirror has a saddle shaped toric surface formed by rotating a curved line having an expansion term of fourth order or higher existing in a plane including the optical axis and parallel to the main scanning direction about the rotation symmetrical axis existing in the plane including the optical axis and parallel to the main scanning direction.

In the above mentioned second aspect, it is preferable that the second curved mirror has a barrel shaped toric surface formed by rotating a circular arc existing in the plane including the optical axis and parallel to the main scanning direction about the rotation symmetrical axis existing in a plane including the optical axis and parallel to the main scanning direction.

Alternatively in the above mentioned second aspect, it is preferable that the second curved mirror has a barrel shaped toric surface formed by rotating a curved line having an expansion term of fourth order or higher existing in a plane including the optical axis and parallel to the main scanning plane including the optical axis and parallel to the main scanning direction.

Alternatively, in the above mentioned first aspect, it is preferable that the first curved mirror has a toric surface having a concave shape in both the main scanning direction and the sub scanning direction.

In the above mentioned first aspect, it is preferable that the first curved mirror has a toric surface with a concave shape in the main scanning direction and a convex shape in the sub scanning direction.

In the above mentioned first or second aspect, it is preferable that the first curved mirror has a toric surface of which refractive power in the sub scanning direction changes in the vicinity of the center portion in the main scanning direction.

In the above mentioned first aspect, it is preferable that the first curved mirror has a barrel shaped toric surface formed by rotating a circular arc existing in a plane including the optical axis and parallel to the main scanning direction about the rotation symmetrical axis existing in the plane including the optical axis and parallel to the main scanning direction.

Alternatively, in tine above mentioned first aspect, it is preferable that the first curved mirror has a barrel shaped toric surface formed by rotating a curved line having an expansion term of fourth order or higher existing in a plane including the optical axis and parallel to the main scanning direction about the rotation symmetrical axis existing in the plane including the optical axis and parallel to the main scanning direction.

In the above mentioned first aspect, it is preferable that the first curved mirror has a saddle shaped toric surface formed by rotating a circular arc existing in a plane including the optical axis and parallel to the main scanning direction about the rotation symmetrical axis existing in the plane including the optical axis and parallel to the main scanning direction.

Alternatively, in the above mentioned first aspect, it is preferable that the first curved mirror has a saddle shaped toric surface formed by rotating a curved line having an expansion term of fourth order or higher existing in a plane including the optical axis and parallel to the main scanning direction about the rotation symmetrical axis existing in the plane including the optical axis and parallel to the main scanning direction.

In the above mentioned first aspect, it is preferable that the first curved mirror has a concave cylindrical surface having a refractive power only in the main scanning direction.

In the above mentioned first aspect, it is further preferable that the first curved mirror has an aspheric cylindrical surface of which section in the main scanning direction has an expansion term of fourth order or higher, having a refractive power only in the main scanning direction.

In the above mentioned first or second aspect, it is preferable that the first image formation optical system converts a light beam from the light source unit into a divergent beam with respect to the main scanning direction.

In the above mentioned first aspect, it is preferable that the first curved mirror has a concave axially symmetrical surface.

In the above mentioned first aspect, it is further preferable that the first curved mirror has an axially symmetrical aspheric surface.

In the above mentioned second aspect, it is preferable that the first curved mirror has a saddle shaped toric surface formed by rotating a circular arc existing in a plane including the optical axis and parallel to the main scanning direction about the rotation symmetrical axis existing in the plane including the optical axis and parallel to the main scanning direction.

Alternatively, in the above mentioned second aspect, it is preferable that the first curved mirror has a saddle shaped toric surface formed by rotating a curved line having an expansion term of fourth order or higher existing in a plane including the optical axis and parallel to the main scanning direction about the rotation symmetrical axis existing in the plane including the optical axis and parallel to the main scanning direction.

In the above mentioned first aspect, it is preferable that the following formula (1) is satisfied, $$0.5 < \frac{L}{f_m} < 1.2 \quad (1)$$

wherein, $f_m$ (mm) denotes the focal length of the second image formation optical system in the main scanning direction;

L (mm) denotes the distance between the deflecting point of the optical deflector at the scanning center and the reflecting point of the first curved mirror.

In the above mentioned first aspect, it is preferable that the following formula (2) is satisfied, $$0.4 < \frac{M}{f_m} < 1.8 \quad (2)$$

wherein, $f_m$ (mm) denotes the focal length of the second image formation optical system in the main scanning direction;

M (mm) denotes the distance between the reflecting point of the second curved mirror at the scanning center and the surface to be scanned.

In the above mentioned first aspect, it is preferable that the following formula (3) is satisfied, $$0.1 < \frac{D}{f_m} < 0.5 \quad (3)$$

wherein, $f_m$ (mm) denotes the focal length of the second image formation optical system in the main scanning direction;

D (mm) denotes the distance between the reflecting point of the first curved mirror at the scanning center and the apex of the second curved mirror.

In the above mentioned second aspect, it is preferable that the following formula (4) is satisfied, $$0 \leq \frac{f_m}{f_{m2}} < 0.8 \quad (4)$$

wherein, $f_m$ (mm) denotes the focal length of the second image formation optical system in the main scanning direction;

$f_{m2}$ (mm) denotes the focal length of the second curved mirror in the main scanning direction.

In the above mentioned second aspect, it is preferable that the following formula (5) is satisfied, $$0.4 < \frac{L}{f_m} < 1.1 \quad (5)$$

wherein, $f_m$ (mm) denotes the focal length of the second image formation optical system in the main scanning direction;

L (mm) denotes the distance between the deflecting point of the optical deflector at the scanning center and the reflecting point of the first curved mirror.

In the above mentioned second aspect, it is preferable that the following formula (6) is satisfied, $$0.2 < \frac{M}{f_m} < 1.4 \quad (6)$$

wherein, $f_m$ (mm) denotes the focal length of the second image formation optical system in the main scanning direction;

M (mm) denotes the distance between the reflecting point of the second curved mirror at the scanning center and the surface to be scanned.

In the above mentioned second aspect, it is preferable that the following formula (7) is satisfied, $$0.1 < \frac{D}{f_m} < 0.5 \quad (7)$$

wherein, $f_m$ (mm) denotes the focal length of the second image formation optical system in the main scanning direction;

D (mm) denotes the distance between the reflecting point of the first curved mirror at the scanning center and the apex of the second curved mirror.

In the above mentioned first aspect, it is preferable that each element is arranged to have a tilt with respect to the sub scanning direction so that a light beam from the first image formation optical system is incident obliquely with respect to the plane of the optical deflector including the normal of the deflecting plane and parallel to the main scanning direction. The reflected light beam from the optical deflector is incident obliquely with respect to the plane of the first curved mirror including the normal at its apex and parallel to the main scanning direction. The reflected light beam from the first curved mirror is incident obliquely with respect to the plane of second curved mirror including the normal at its apex and parallel to the main scanning direction. With the premise that the angle between the reflected light beam reflected by the deflecting plane and the incident light beam to the deflecting plane from the first image formation optical system is positive, the angle between the reflected light beam reflected by the first curved mirror and the incident light beam to the first cueved mirror from the deflecting plane is negative, and the angle between the reflected light beam reflected by the the second curved mirror and the incident light beam to the second curved mirror from the first curved mirror is positive, with respect to the section in the sub scanning direction.

In the above mentioned second aspect, it is preferable that each element is arranged to have a tilt with respect to the sub scanning direction so that a light beam from the first image formation optical system is incident obliquely with respect to the plane of the optical deflector including the normal of the deflecting plane and parallel to the main scanning direction. The reflected light beam from the optical deflector is incident obliquely with respect to the plane of the first curved mirror including the normal at its apex and parallel to the main scanning direction. The reflected light beam from the first curved mirror is incident obliquely with respect to the second curved mirror including the normal at its apex and parallel to the main scanning direction. With the premise that the angle between the reflected light beam reflected by the deflecting plane and the incident light beam to the deflecting plane from the first image formation optical system is positive, the angle between the reflected light beam reflected by the first curved mirror and the incident light beam to the first curved mirror from the deflecting plane is negative, and the angle between the reflected light beam reflected by the plane of the second curved mirror and the incident light beam to the second curved mirror from the first curved mirror is negative. with respect to the section in the sub scanning direction.

In the above mentioned first or second aspect, it is further preferable that the light source unit comprises a wavelength changeable light source and a wavelength controlling unit.

A third aspect of the optical scanner of the present invention comprises a light source unit having a plurality of light sources, an optical deflector to scan the light beam from the light source unit, light mixing means disposed between the light source unit and the optical deflector for mixing light beams from the light sources, a first image formation optical system disposed between the light source unit and the optical deflector, and a second image formation optical system disposed between the optical deflector and a surface to be scanned. The second image formation optical system comprises a first curved mirror to reflect the light beam from the optical deflector and a second curved mirror having a toric surface with a convex shape in the main scanning direction, which is the direction a light beam is scanned in, and a concave shape in the sub scanning direction, which is the direction perpendicular to the main scanning direction, to focus the light beam from the first curved mirror on the surface to be scanned.

A fourth aspect of the optical scanner of the present invention comprises a light source unit having a plurality of light sources, an optical deflector to scan the light beam from the light source unit, light mixing means disposed between the light source unit and the optical deflector for mixing light beams from the plurality of light sources, a first image formation optical system disposed between the light source unit and the optical deflector, and a second image formation optical system disposed between the optical deflector and a surface to be scanned. The second image formation optical system comprises a first curved mirror having a toric surface with a concave shape in the main scanning direction, which is the direction a light beam is scanned in, and a convex shape in the sub scanning direction, which is the direction perpendicular to the main scanning direction, to reflect the light beam from the optical deflector, and a second curved mirror having a toric surface or a cylindrical surface without a refractive power or with a concave shape in the main scanning direction and with a concave shape in the sub scanning direction to focus the light beam from the first curved mirror on the surface to be scanned.

In any of the above mentioned first to fourth aspects, it is preferable that the first curved mirror and the second curved mirror of the second image formation optical system are integrated in one body.

In the above mentioned third or fourth aspect, it is preferable to further comprise light separating means disposed between the optical deflector and the surface to be scanned for separating a light beam into a plurality of light beams.

In the above mentioned third or fourth aspect, it is preferable that wavelengths of light beams emitted from the plurality of light sources of the light source unit are different.

In the above mentioned third or fourth aspect, it is preferable that the light mixing means comprises one selected from the group consisting of a dichroic mirror and a half mirror.

In the above mentioned third or fourth aspect, it is preferable that the light separating means comprises one selected from the group consisting of a diffraction grating and a dichroic mirror.

Image forming apparatus and image reading apparatus of the present invention comprise an optical scanner of any of the above mentioned aspects.

According to the first aspect of the optical scanner of the present invention, the light beam from the light source is incident by the first image formation optical system to the reflecting plane of the rotating optical deflector to be scanned and then focused on the surface to be scanned by the second image formation optical system. At the time, since the second image, formation optical system comprises the first curved mirror and the second curved mirror having a toric surface with a convex shape in the main scanning direction and a concave shape in the sub scanning direction, the curvature of field and the f$\theta$ characteristic can be preferably compensated to achieve a high resolution with a compact structure at a low cost.

Further, in the first aspect of the optical scanner of the present invention, when the second curved mirror has a toric surface of which refractive power in the sub scanning direction changes in the vicinity or the center portion in the main scanning direction, the curvature of field and the f$\theta$ characteristic can be more preferably compensated.

Alternatively, in the above mentioned first aspect, when the second curved mirror has the saddle shaped toric surface formed by rotating the circular arc existing in the plane including the optical axis and parallel to the main scanning direction about the rotation symmetrical axis existing in the plane including the optical axis and parallel to the main scanning direction, the refractive power in the sub scanning direction can be changed in the vicinity of the center portion in the main scanning direction at a low cost.

Alternatively, in the above mentioned first aspect, when the second curved mirror has the saddle shaped toric surface formed by rotating the curved line having the expansion term of fourth order or higher existing in the plane including the optical axis and parallel to the main scanning direction about the rotation symmetrical axis existing in the plane including the optical axis and parallel to the main scanning direction, the curvature of field and the fθ characteristic can be more preferably compensated.

Furthyermore, in the above mentioned first aspect, when the compensated.

Furthermore, in the above mentioned first aspect, when the first curved mirror has the shape selected from the group consisting of the toric surface having the concave shape in both the main scanning direction and the sub scanning direction, the concave cylindrical surface having the refractive power only in the main scanning direction, the toric surface having the concave shape in the main scanning direction and the convex shape in the sub scanning direction, and the concave axially symmetrical surface, the curvature of field and the fθ characteristic can be more preferably compensated.

Furthermore, in the above mentioned first aspect, when the first curved mirror has the toric surface of which refractive power in the sub scanning direction changes in the vicinity of the center portion in the main scanning direction, the curvature of field and the fθ characteristic can be more preferably compensated.

Alternatively, in the above mentioned first aspect, when the first curved mirror has the barrel shaped or saddle shaped toric surface formed by rotating the circular arc existing in the plane including the optical axis and parallel to the main scanning direction about the rotation symmetrical axis existing in the plane including the optical axis and parallel to the main scanning direction, the refractive power in the sub scanning direction can be changed in the vicinity or the center portion in the main scanning direction at a low cost.

Alternatively, in the above mentioned first aspect, when the first curved mirror has the barrel shaped or saddle shaped toric surface formed by rotating the curved line having the expansion term of fourth order or higher existing in the plane including the optical axis and parallel to the main scanning direction about the rotation symmetrical axis existing in the plane including the optical axis and parallel to the main scanning direction, the curvature of field and the fθ characteristic can be more preferably compensated.

Alternatively, in the above mentioned first aspect, when the first curved mirror has the aspheric cylindrical surface of which section in the main scanning direction has the expansion term of fourth order or higher having the refractive power only in the main scanning direction, the curvature of field and the fθ characteristic can be more preferably compensated.

Alternatively, in the above mentioned first aspect, when the first curved mirror has the toric surface or the cylindrical surface and the first image formation optical system converts the light beam from the light source unit into the divergent beam with respect to the main scanning direction, the curvature of field and the fθ characteristic can be more preferably compensated.

Alternatively, in the above mentioned first aspect, when the first curved mirror has the concave axially symmetrical aspheric surface, the curvature of field and the fθ characteristic can be more preferably compensated.

In the above mentioned first aspect, when the above mentioned formula (1) is satisfied, the curvature of field and the fθ characteristic can be more preferably compensated.

In the above mentioned first aspect, when the above mentioned formula (2) is satisfied, the curvature of field and the fθ characteristic can be more preferably compensated.

I)n the above mentioned first aspect, when the above mentioned formula (3) is satisfied, the curvature of field and the fθ characteristic can be more preferably compensated.

According to the above mentioned second aspect, since the second image formation optical system comprises the first curved mirror having the toric surface with the concave shape in the main scanning direction and the convex shape in the sub scanning direction and the second curved mirror having the toric surface without the refractive power or with the concave shape in the main scanning direction and with the concave shape or cylindrical surface in the sub scanning direction, the curvature of field and the fθ characteristic can be preferably compensated to achieve a high resolution with a compact structure at a low cost.

Furthermore, in the above mentioned second aspect, when the second curved mirror has the toric surface of which refractive power in the sub scanning direction changes in the vicinity of the center portion in the main scanning direction, the curvature of field and the fθ characteristic can be more preferably compensated.

Alternatively, in the above mentioned second aspect, when the second curved mirror has the barrel shaped toric surface formed by rotating the circular arc existing in the plane including the optical axis and parallel to the main scanning direction about the rotation symmetrical axis existing in the plane including the optical axis and parallel to the main scanning direction, the refractive power in the sub scanning direction can be changed in the vicinity of the center portion in the main scanning direction at a low cost.

Alternatively, in the above mentioned second aspect, when the second curved mirror has the barrel shaped toric surface formed by rotating the curved line having the expansion term of fourth order or higher existing in the plane including the optical axis and parallel to the main scanning direction about the rotation symmetrical axis existing in the plane including the optical axis and parallel to the main scanning direction, the curvature of field and the fθ characteristic can be more preferably compensated.

Furthermore, in the above mentioned second aspect, when the first curved mirror has the toric surface of which refractive power in the sub scanning direction changes in the vicinity of the center portion in the main scanning direction, the curvature of field and the fθ characteristic can be more preferably compensated.

Alternatively, in the above mentioned second aspect, when the first curved mirror has the saddle shaped toric surface formed by rotating the circular arc existing in the plane including the optical axis and parallel to the main scanning direction about the rotation symmetrical axis existing in the plane including the optical axis and parallel to the main scanning direction, the refractive power in the sub scanning direction can be changed in the vicinity of the center portion in the main scanning direction at a low cost.

Alternatively, in the above mentioned second aspect, when the first curved mirror has the saddle shaped toric surface formed by rotating the curved line having the expansion term of fourth order or higher existing in the plane including the optical axis and parallel to the main scanning direction about the rotation symmetrical axis existing in the plane including the optical axis and parallel to the main scanning direction, the curvature of field and the fθ characteristic can be more preferably compensated.

In the above mentioned second aspect, when the above mentioned formula (4) is satisfied, the curvature of field and the fθ characteristic can be more preferably compensated.

In the above mentioned second aspect, when the above mentioned formula (5) is satisfied, the curvature of field and the fθ characteristic can be more preferably compensated.

In the above mentioned second aspect, when the above mentioned formula (6) is satisfied, the curvature of field and the fθ characteristic can be more preferably compensated.

In the above mentioned second aspect, when the above mentioned formula (7) is satisfied, the curvature of field and the fθ characteristic can be more preferably compensated.

In the above mentioned first or second aspect, when each element is arranged to have the tilt with respect to the sub scanning direction, the light beam from the first image formation optical system is incident obliquely with respect to the plane of the optical deflector including the normal of the deflecting plane and parallel to the main scanning direction, the reflected light beam from the optical deflector is incident obliquely with respect to the plane of the first curved mirror including the normal at its apex and parallel to the main scanning direction, and the reflected light beam from the first curved mirror is incident obliquely with respect to the second curved mirror including the normal at its apex and parallel to the main scanning direction. Thus, the light beam can reach the surface to be scanned without being obstructed by the second curved mirror before entering the first curved mirror or by the first curved mirror after reflected by the second curved mirror.

Further, in the above mentioned first or second aspect, with the premise that the angle between the reflected light beam reflected by the deflecting plane and the incident light beam to the deflecting plane from the first image formation optical system is positive in the section of the sub scanning direction, when the angle between the reflected light beam reflected by the first cueved mirror and the incident light meam to the first curved mirror mirror from the deflecting plane is negative and the angle between the reflected light beam reflected by the second curved mirror and the incident light beam to the second curbed mirror from the first curved mirror is positive in the first aspect and is negative in the second aspect, a curve in scanning line (bowing) in the sub scanning direction generated by the oblique incidence on each mirror can be offset and compensated by the interaction of the mirrors.

Further, in the first or second aspect, when the light source unit comprises the wavelength changeable light source and the wavelength controlling portion, a spot diameter on the surface to be scanned can be selected optionally by controlling the wavelength.

According to the above mentioned third aspect, since the light source unit has a plurality of the light sources, the light mixing means for mixing the light beams from the pluratlity of light sources is disposed between the light source unit and the optical deflector, and the second image formation optical system is disposed between the optical deflector and the surface to be scanned comprising the first curved mirror to reflect the light beam from the optical deflector and the second curved mirror having the toric surface with the convex shape in the main scanning direction and a concave shape in the sub scanning direction to focus the light beam from the first curved mirror on the surface to be scanned, line image data at least twice as much compared with the case of scanning with one light source can be scanned with a high resolution on the surface to be scanned.

According to the above mentioned fourth aspect, since the light source unit has a plurality of the light sources, the light mixing means for mixing the light beams from the plurality of light sources is disposed between the light source unit and the optical deflector, and the second image formation optical system is disposed between the optical deflector and the surface to be scanned comprising the first curved mirror having the toric surface with the concave shape in the main scanning direction and the convex shape in the sub scanning direction, and the second curved mirror having the toric surface or the cylindrical surface without the refractive power or with the concave shape in the main scanning direction and with the concave shape in the sub scanning direction, line image data at least twice as much compared with the case of scanning with one light source can be scanned with a high resolution on the surface to be scanned.

In the above mentioned third or fourth aspect, when the light separating means for separating the light beam into a plurality of light beams is disposed between the optical deflector and the surface to be scanned, at least two line images can be formed on the surface to be scanned simultaneously to at least double the rate of image forming or the rate of image reading.

In the above mentioned third or fourth aspects, when the light source unit having a plurality of the light sources emitting light beams of different wavelengths, the light mixing means comprising one selected from the group consisting of the dichroic mirror and the half mirror, and the light separating means comprising one selected from the group consisting of the diffraction grating and the dichroic mirror, the image forming rate or the image reading rate can be at least doubled at a low cost. In these cases, when the second image formation optical system consists of the reflecting mirror, chromatic aberration liable to generate with lights having different wavelengths does not generate at all to provide an optical scanner with a high resolution and a high speed.

In of the above mentioned first to fourth aspects, when the first curved mirror and the second curved mirror of the second image formation optical system are integrated in one body having the first curved surface to reflect the light beam from the optical deflector and the second curved surface to reflect the light beam from the first curved surface to focus on the surface to be scanned, an optical scanner having a high resolution can be provided at a low cost.

Further, by using the optical scanner of any of the above mentioned aspects, the image forming apparatus or the image reading apparatus with a high resolution and a high speed having a compact structure can be achieved at a low cost.

DETAILED DESCRIPTION OF THE INVENTION (First Embodiment)

Figure 1:
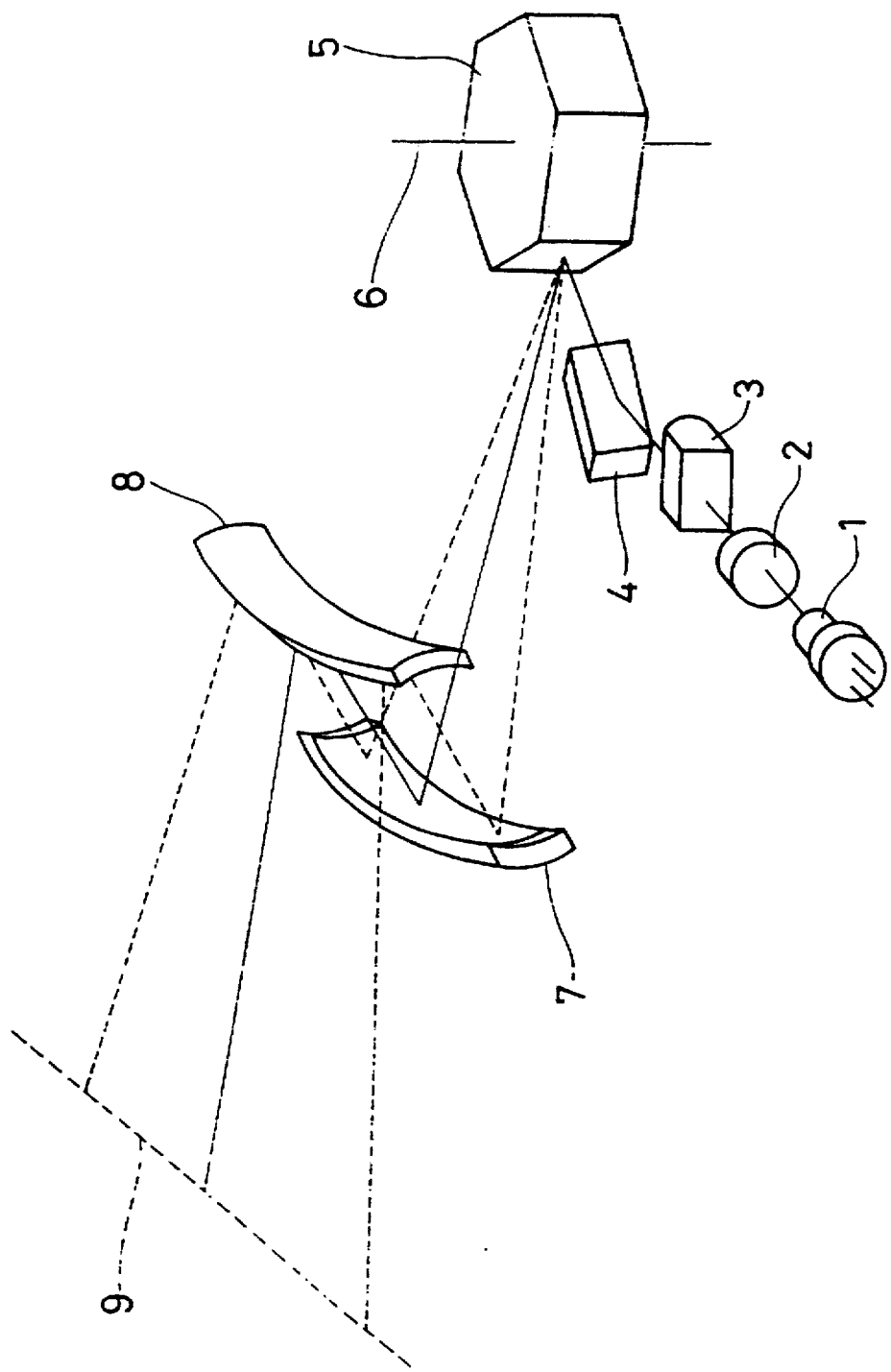
FIG. 1 is a perspective view illustrating a structure of a first embodiment of the optical scanner of the present invention.
Figure 2:
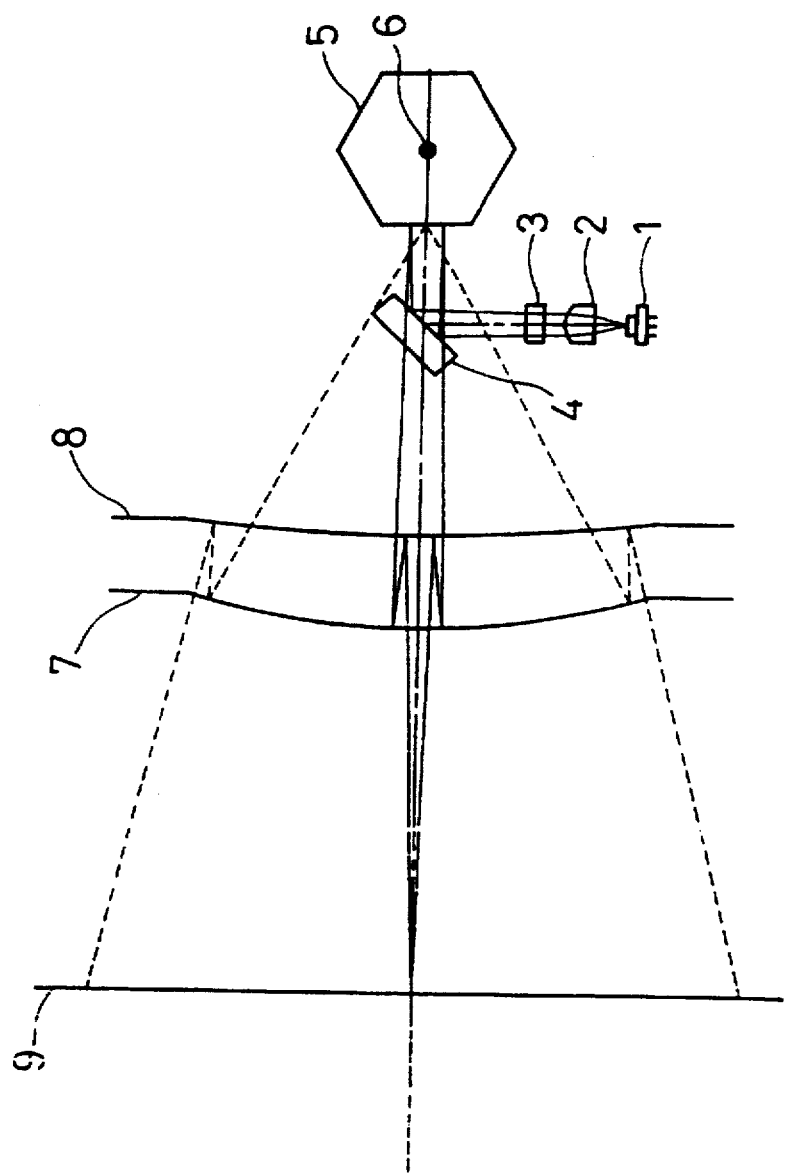
FIG. 2 is a plan view illustrating an arrangement in the main scanning plane of the first embodiment of the optical scanner of the present invention.

A first embodiment of an optical scanner of the present invention is described with reference to FIGS. 1 to 3. In FIG. 1, the optical scanner of the first embodiment comprises a semiconductor laser 1 serving as a light source, an axially symmetrical lens 2, a cylindrical lens 3 and a reflecting mirror 4 serving as a first image formation optical system, a polygon mirror 5 rotating about a center axis 6 serving as an optical deflector, and a first curved mirror 7 and a second curved mirror 8 serving as a second image formation optical system. Numeral 9 denotes a surface to be scanned.

Figure 22A:
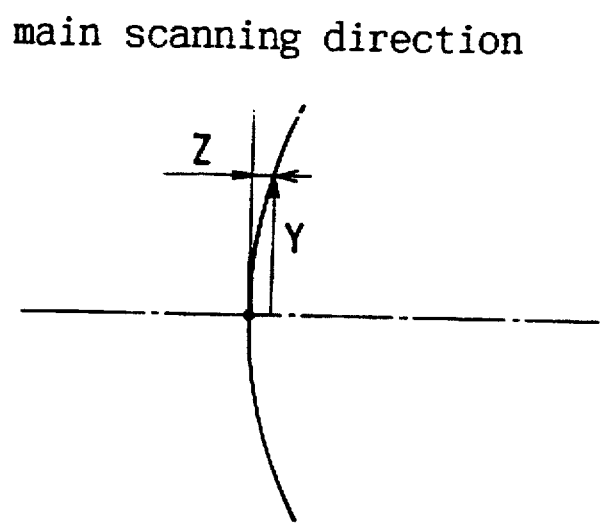
FIGS. 22A and 22B are diagrams showing the main and substitute scanning direction.
Figure 22B:
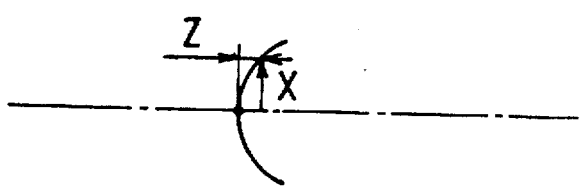

The following discussion relates to the surface shape of the first curved mirror and the numerical examples which follow. The first curved mirror 7 has a barrel shaped toric surface with a concave shape in the main scanning direction and a concave shape in the sub scanning direction in the numerical examples (1) to (7), an aspheric cylindrical surface with a concave shape in the main scanning direction in the numerical example (8), and a saddle shaped toric surface with a concave shape in the main scanning direction and a convex shape in the sub scanning direction in the numerical examples (9) to (11). The sag from the apex as z (mm) at a point with the coordinate of distance x (mm) from the symmetrical axis in the sub scanning direction and y (mm) from the symmetrical axis in the main scanning direction with the premise that the direction in which incident light travels forward is positive, which is described with reference to FIGS. 22A and 22B, is defined by the following formula (8). The "main scanning direction" denotes the direction in which a light beam is scanned, and the "sub scanning direction" denotes the direction perpendicular to the main scannind direction. The same expression is employed hereinafter.

$$z = f(y) + \frac{1}{2} \cdot \frac{1}{R_{1v}} \cdot \{x^2 + y^2 - f^2(y)\} \tag{8}$$

wherein, $$f(y) = \frac{\frac{y^2}{R_{1H}}}{1 + \left\{1 - (1+K_1)\left(\frac{y}{R_{1H}}\right)^2\right\}^{1/2}} + D_1'y^4 + E_1'y^6 + F_1'y^8 + G_1'y^{10}$$

In the formula (8), $R_{1H}$ (mm) denotes curvature in the main scanning direction; $R_{1V}$ (mm) denotes curvature in the sub scanning direction; $K_1$ denotes cone constant with respect to the main scanning direction; and $D_1$, $E_1$, $F_1$ and $G_1$ denote constants of a higher order with respect to the main scanning direction.

Figure 23:
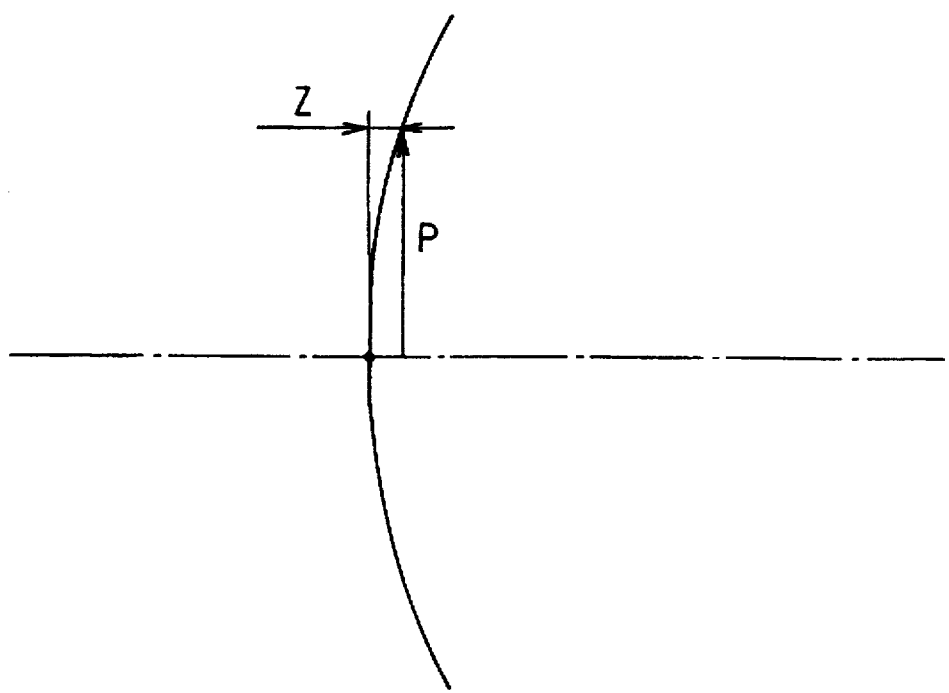
FIG. 23 is a diagram showing the main and substitute scanning direction.

In the numerical examples (12) to (14), the first curved mirror 7 has an axially symmetrical aspheric surface and the sag from the apex of the plane at a point with a distance p (mm) from the symmetrical axis is defined as z (mm) with the premise that the direction to which incident light travels forward is positive, which is described with reference to FIG. 23, is defined by the following formula (9).

$$z = \frac{\frac{p^2}{R_1}}{1 + \left\{1 - (1+K_1)\left(\frac{p}{R_1}\right)^2\right\}^{1/2}} + D_1'p^4 + E_1'p^6 + F_1'p^8 + G_1'p^{10} \tag{9}$$

In the formula (9), $R_1$ (mm) denotes curvature; $K_1$ denotes cone constant; and $D_1$, $E_1$, $F_1$ and $G_1$ denote constants of a high order.

In the numerical examples (1) to (14), the second curved mirror 8 has a saddle shaped toric surface with a convex shape in the main scanning direction and a concave shape in the sub scanning direction, and the distance of a coordinate in the sub scanning direction with the apex of the plane as the origin is defined by the following formula (10), where the sag from the apex is z (mm) at a point with the coordinate of distances x (mm) and y (mm) in the main scanning direction with the premise that the direction in which an incident light travels forward is positive.

$$z = f(y) + \frac{1}{2} \cdot \frac{1}{R_{2v}} \cdot \{x^2 + y^2 - f^2(y)\} \qquad (10)$$

wherein, $$f(y) = \frac{\frac{y^2}{R_{2H}}}{1 + \left\{1 - (1+K_2)\left(\frac{y}{R_{2H}}\right)^2\right\}^{1/2}} + D_2'y^4 + E_2'y^6 + F_2'y^8 + G_2'y^{10}$$

In the formula (10), $R_{2H}$ (mm) denotes curvature in the main scanning direction; $R_{2V}$ (mm) denotes curvature in the sub scanning direction; $K_2$ denotes cone constant with respect to the main scanning direction; and $D_2$, $E_2$, $F_2$ and $G_2$ denote constants of a high order with respect to the main scanning direction.

Figure 3:
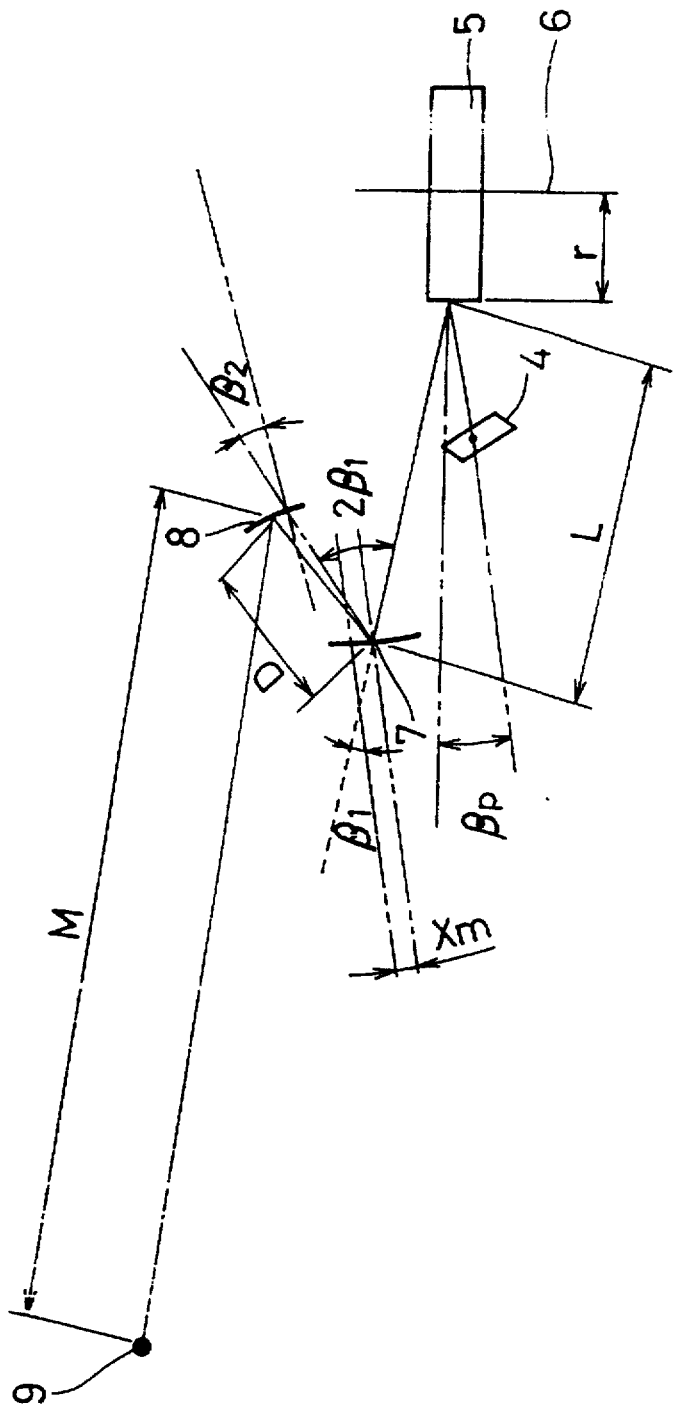
FIG. 3 is a section view illustrating the sub scanning section of the first embodiment of the optical scanner of the present invention.

In FIG. 3, L (mm) denotes the distance between the deflecting point of the polygon mirror 5 and the reflecting point of the first curved mirror 7; D (mm) denotes the distance between the reflecting point of the first curved mirror 7 and the apex of the second curved mirror 8; M (mm) denotes the distance between the reflecting point of the second curved mirror 8 and the surface to be scanned 9; r (mm) denotes the distance between the reflecting point of the polygon mirror 5 and the center of rotation axis 6; with the premise that the direction shown in FIG. 3 is positive, $x_m$ (mm) denotes the amount of decentering from the reflecting point at the apex of the first curved mirror 7 in the sub scanning direction; $\beta_P$ (deg) denotes the angle determined by the normal of the reflecting plane of the polygon mirror 5 and the optical axis of the reflecting mirror 4; $\beta_1$ (deg) denotes the angle determined by the normal of the first curved mirror 7 at its apex and the optical axis of the polygon mirror 5; and $\beta_2$ (deg) denotes the angle determined by the normal of the second curved mirror 8 at its apex and the line connecting the reflecting point of the first curved mirror 7 and the apex of the second curved mirror 8, in other words, the line to determine the angle of $2\beta_1$ with the optical axis of the polygon mirror 5 toward the first curved mirror 7 as illustrated in FIG. 3. As to $\beta_P$, $\beta_1$, $\beta_2$, clockwise direction in FIG. 3 is defined to be positive.

Concrete examples of numerals will be described as the numerical examples (1) to (14) in Tables 1 to 14. In the Tables, $f_m$ (mm) denotes the focal length of the second image formation optical system in the main scanning direction. The effective scanning width in the numerical examples is 220 mm.

Numerical Example 1

TABLE 1

| | | | |
|---|---|---|---|
| L | 87.1 | D | 25.0 |
| M | 154.0 | r | 17.3 |
| $x_m$ | 25.0 | $\beta_p$ | 7.0 |
| $\beta_1$ | −11.3 | $\beta_2$ | 7.9 |
| $f_m$ | 98.4 | | |
| $R_{1H}$ | 132.2 | $R_{2H}$ | 250.3 |
| $R_{1v}$ | 200.0 | $R_{2v}$ | −283.0 |
| $K_1$ | 0.00000 | $K_2$ | 0.00000 |
| $D_1$ | −3.21450e-09 | $D_2$ | 0.00000 |
| $E_1$ | 1.53383e-13 | $E_2$ | 0.00000 |
| $F_1$ | 0.00000 | $F_2$ | 0.00000 |
| $G_1$ | 0.00000 | $G_2$ | 0.00000 |

Numerical Example 2

TABLE 2

| | | | |
|---|---|---|---|
| L | 81.8 | D | 20.0 |
| M | 155.8 | r | 17.3 |
| $x_m$ | 15.0 | $\beta_p$ | 7.0 |
| $\beta_1$ | −16.0 | $\beta_2$ | 17.5 |
| $f_m$ | 101.2 | | |
| $R_{1H}$ | 133.3 | $R_{2H}$ | 273.1 |
| $R_{1v}$ | 220.0 | $R_{2v}$ | −247.8 |
| $K_1$ | 0.00000 | $K_2$ | 0.00000 |
| $D_1$ | −5.26190e-09 | $D_2$ | 0.00000 |
| $E_1$ | −1.05791e-14 | $E_2$ | 0.00000 |
| $F_1$ | 0.00000 | $F_2$ | 0.00000 |
| $G_1$ | 0.00000 | $G_2$ | 0.00000 |

Numerical Example 3

TABLE 3

| | | | |
|---|---|---|---|
| L | 80.0 | D | 20.0 |
| M | 159.5 | r | 17.3 |
| $x_m$ | 15.0 | $\beta_p$ | 7.0 |
| $\beta_1$ | −13.0 | $\beta_2$ | 11.7 |
| $f_m$ | 99.2 | | |
| $R_{1H}$ | 131.0 | $R_{2H}$ | 267.8 |
| $R_{1v}$ | 220.0 | $R_{2v}$ | −231.2 |
| $K_1$ | 0.00000 | $K_2$ | 0.00000 |
| $D_1$ | −4.75195e-09 | $D_2$ | 0.00000 |
| $E_1$ | −8.62702e-14 | $E_2$ | 0.00000 |
| $F_1$ | 0.00000 | $F_2$ | 0.00000 |
| $G_1$ | 0.00000 | $G_2$ | 0.00000 |

Numerical Example 4

TABLE 4

| | | | |
|---|---|---|---|
| L | 79.3 | D | 30.0 |
| M | 152.5 | r | 17.3 |
| $x_m$ | 5.0 | $\beta_p$ | 8.5 |
| $\beta_1$ | −21.5 | $\beta_2$ | 23.4 |
| $f_m$ | 93.2 | | |
| $R_{1H}$ | 141.2 | $R_{2H}$ | 334.4 |
| $R_{1v}$ | 300.0 | $R_{2v}$ | −197.3 |
| $K_1$ | 0.00000 | $K_2$ | 0.00000 |
| $D_1$ | −1.06702e-08 | $D_2$ | 0.00000 |
| $E_1$ | −4.60126e-13 | $E_2$ | 0.00000 |
| $F_1$ | 0.00000 | $F_2$ | 0.00000 |
| $G_1$ | 0.00000 | $G_2$ | 0.00000 |

Numerical Example 5

TABLE 5

| | | | |
|---|---|---|---|
| L | 128.8 | D | 50.0 |
| M | 94.9 | r | 17.3 |
| $x_m$ | 0.0 | $\beta_p$ | 10.0 |
| $\beta_1$ | −1.5 | $\beta_2$ | 6.1 |
| $f_m$ | 124.1 | | |
| $R_{1H}$ | 177.0 | $R_{2H}$ | 268.2 |
| $R_{1v}$ | 300.0 | $R_{2v}$ | −174.5 |
| $K_1$ | 0.00000 | $K_2$ | 0.00000 |
| $D_1$ | 2.22592e-09 | $D_2$ | 0.00000 |
| $E_1$ | 9.68685e-14 | $E_2$ | 0.00000 |
| $F_1$ | −2.44355e-18 | $F_2$ | 0.00000 |
| $G_1$ | 5.88589e-22 | $G_2$ | 0.00000 |

Numerical Example 6

TABLE 6

| | | | |
|---|---|---|---|
| L | 76.0 | D | 30.0 |
| M | 158.5 | r | 17.3 |
| $x_m$ | 20.0 | $\beta_p$ | 8.5 |

TABLE 6-continued

| | | | |
|---|---|---|---|
| $\beta_1$ | -12.0 | $\beta_2$ | 5.4 |
| $f_m$ | 95.1 | | |
| $R_{1H}$ | 148.8 | $R_{2H}$ | 407.4 |
| $R_{1v}$ | 500.0 | $R_{2v}$ | -150.6 |
| $K_1$ | 0.00000 | $K_2$ | 0.00000 |
| $D_1$ | -1.23582e-08 | $D_2$ | 0.00000 |
| $E_1$ | -4.17860e-13 | $E_2$ | 0.00000 |
| $F_1$ | 0.00000 | $F_2$ | 0.00000 |
| $G_1$ | 0.00000 | $G_2$ | 0.00000 |

Numerical Example 7

TABLE 7

| | | | |
|---|---|---|---|
| L | 75.8 | D | 25.0 |
| M | 148.4 | r | 17.3 |
| $x_m$ | 20.0 | $\beta_p$ | 8.5 |
| $\beta_1$ | -15.0 | $\beta_2$ | 11.7 |
| $f_m$ | 106.1 | | |
| $R_{1H}$ | 174.3 | $R_{2H}$ | 696.2 |
| $R_{1v}$ | 4000.0 | $R_{2v}$ | -125.1 |
| $K_1$ | 0.00000 | $K_2$ | 0.00000 |
| $D_1$ | -1.40509e-08 | $D_2$ | 0.00000 |
| $E_1$ | -1.70648e-13 | $E_2$ | 0.00000 |
| $F_1$ | 0.00000 | $F_2$ | 0.00000 |
| $G_1$ | 0.00000 | $G_2$ | 0.00000 |

Numerical Example 8

TABLE 8

| | | | |
|---|---|---|---|
| L | 76.4 | D | 25.0 |
| M | 145.9 | r | 17.3 |
| $x_m$ | 20.0 | $\beta_p$ | 8.5 |
| $\beta_1$ | -15.0 | $\beta_2$ | 11.5 |
| $f_m$ | 108.0 | | |
| $R_{1H}$ | 179.1 | $R_{2H}$ | 757.0 |
| $R_{1v}$ | ∞ | $R_{2v}$ | -122.1 |
| $K_1$ | 0.00000 | $K_2$ | 0.00000 |
| $D_1$ | -1.36439e-08 | $D_2$ | 0.00000 |
| $E_1$ | -1.36183e-13 | $E_2$ | 0.00000 |
| $F_1$ | 0.00000 | $F_2$ | 0.00000 |
| $G_1$ | 0.00000 | $G_2$ | 0.00000 |

Numerical Example 9

TABLE 9

| | | | |
|---|---|---|---|
| L | 76.9 | D | 25.0 |
| M | 142.1 | r | 17.3 |
| $x_m$ | 0.0 | $\beta_p$ | 8.5 |
| $\beta_1$ | -15.0 | $\beta_2$ | 11.7 |
| $f_m$ | 110.9 | | |
| $R_{1H}$ | 189.0 | $R_{2H}$ | 942.3 |
| $R_{1v}$ | -2000.0 | $R_{2v}$ | -117.2 |
| $K_1$ | 0.00000 | $K_2$ | 0.00000 |
| $D_1$ | -1.35240e-08 | $D_2$ | 0.00000 |
| $E_1$ | -7.92593e-14 | $E_2$ | 0.00000 |
| $F_1$ | 0.00000 | $F_2$ | 0.00000 |
| $G_1$ | 0.00000 | $G_2$ | 0.00000 |

Numerical Example 10

TABLE 10

| | | | |
|---|---|---|---|
| L | 77.7 | D | 25.0 |
| M | 140.5 | r | 17.3 |
| $x_m$ | -20.0 | $\beta_p$ | 8.5 |
| $\beta_1$ | -15.0 | $\beta_2$ | 13.5 |
| $f_m$ | 112.0 | | |
| $R_{1H}$ | 191.9 | $R_{2H}$ | 989.1 |
| $R_{1v}$ | -2000.0 | $R_{2v}$ | -118.6 |
| $K_1$ | -1.26703e-01 | $K_2$ | 0.00000 |

TABLE 10-continued

| | | | |
|---|---|---|---|
| $D_1$ | -1.90010e-08 | $D_2$ | -9.13606e-09 |
| $E_1$ | 1.31572e-12 | $E_2$ | 1.46874e-12 |
| $F_1$ | 6.13812e-19 | $F_2$ | 0.00000 |
| $G_1$ | 1.45836e-21 | $G_2$ | 0.00000 |

Numerical Example 11

TABLE 11

| | | | |
|---|---|---|---|
| L | 81.4 | D | 25.0 |
| M | 124.2 | r | 17.3 |
| $x_m$ | -30.0 | $\beta_p$ | 8.5 |
| $\beta_1$ | -14.75 | $\beta_2$ | 21.5 |
| $f_m$ | 122.5 | | |
| $R_{1H}$ | 220.8 | $R_{2H}$ | 1731.0 |
| $R_{1v}$ | -1000.0 | $R_{2v}$ | -118.7 |
| $K_1$ | 0.00000 | $K_2$ | 0.00000 |
| $D_1$ | -1.98600e-08 | $D_2$ | -1.05557e-08 |
| $E_1$ | 1.24689e-12 | $E_2$ | 1.28619e-12 |
| $F_1$ | -1.16151e-17 | $F_2$ | 0.00000 |
| $G_1$ | 1.07028e-21 | $G_2$ | 0.00000 |

Numerical Example 12

TABLE 12

| | | | |
|---|---|---|---|
| L | 77.6 | D | 25.0 |
| M | 119.4 | r | 17.3 |
| $x_m$ | 0.0 | $\beta_p$ | 2.0 |
| $\beta_1$ | -14.0 | $\beta_2$ | 28.0 |
| $f_m$ | 120.1 | | |
| $R_{1H}$ | 175.0 | $R_{2H}$ | 460.6 |
| | | $R_{2v}$ | -242.6 |
| $K_1$ | 0.00000 | $K_2$ | 0.00000 |
| $D_1$ | -2.96610e-08 | $D_2$ | -3.38935e-08 |
| $E_1$ | -8.01025e-13 | $E_2$ | 8.86309e-13 |
| $F_1$ | 8.42834e-17 | $F_2$ | 0.00000 |
| $G_1$ | -3.69148e-21 | $G_2$ | 0.00000 |

Numerical Example 13

TABLE 13

| | | | |
|---|---|---|---|
| L | 88.2 | D | 25.0 |
| M | 97.1 | r | 17.3 |
| $x_m$ | 0.0 | $\beta_p$ | 2.0 |
| $\beta_1$ | -7.0 | $\beta_2$ | 9.1 |
| $f_m$ | 134.8 | | |
| $R_{1H}$ | 175.0 | $R_{2H}$ | 356.4 |
| | | $R_{2v}$ | -200.5 |
| $K_1$ | 0.00000 | $K_2$ | 0.00000 |
| $D_1$ | -3.09734e-08 | $D_2$ | -5.06642e-08 |
| $E_1$ | -7.00573e-13 | $E_2$ | 1.42402e-12 |
| $F_1$ | 5.16880e-17 | $F_2$ | 0.00000 |
| $G_1$ | -7.21793e-22 | $G_2$ | 0.00000 |

Numerical Example 14

TABLE 14

| | | | |
|---|---|---|---|
| L | 99.7 | D | 25.0 |
| M | 79.5 | r | 17.3 |
| $x_m$ | 0.0 | $\beta_p$ | 4.0 |
| $\beta_1$ | -7.5 | $\beta_2$ | 6.1 |
| $f_m$ | 145.6 | | |
| $R_{1H}$ | 160.0 | $R_{2H}$ | 244.2 |
| | | $R_{2v}$ | -205.5 |
| $K_1$ | 0.00000 | $K_2$ | 0.00000 |
| $D_1$ | -3.33070e-08 | $D_2$ | -7.95597e-08 |
| $E_1$ | -1.16246e-12 | $E_2$ | 1.98596e-12 |
| $F_1$ | 3.56046e-17 | $F_2$ | 0.00000 |
| $G_1$ | 6.54055e-23 | $G_2$ | 0.00000 |

Figure 16:
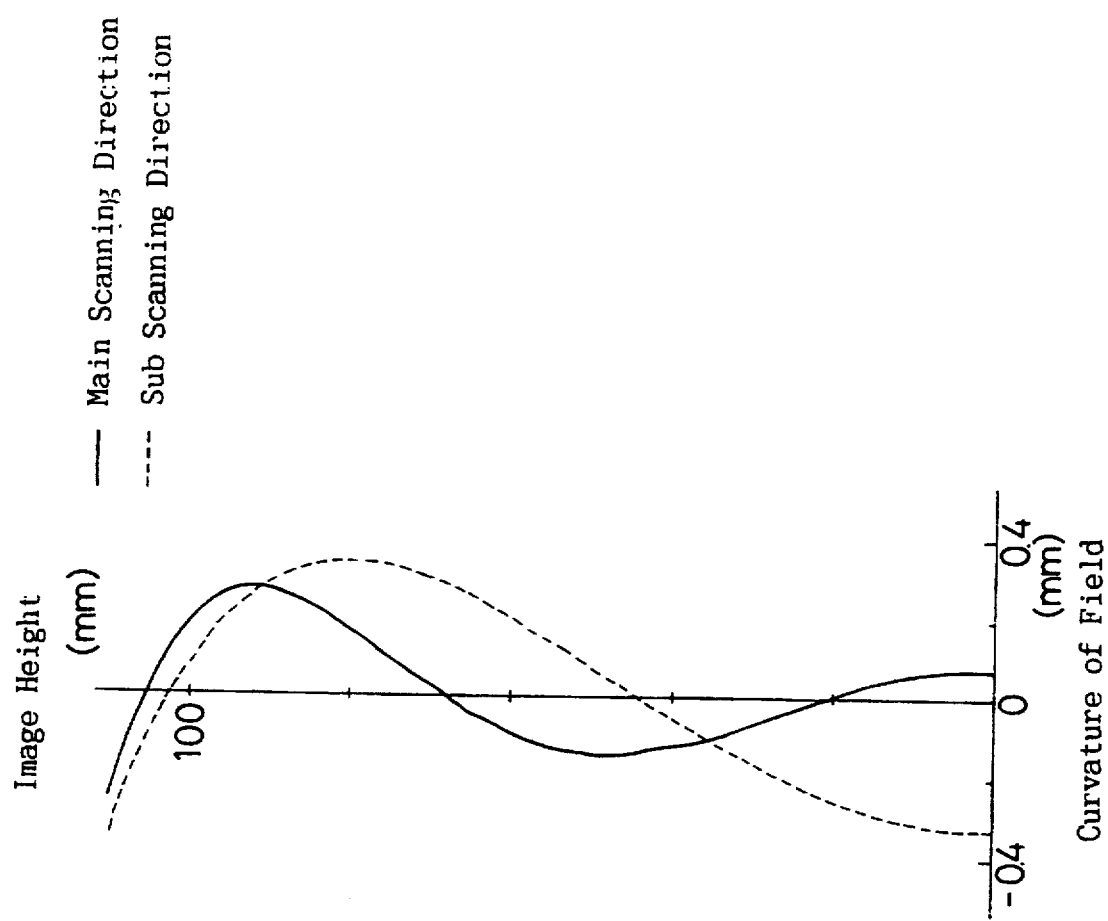
FIG. 16 is a graph illustrating amounts of curvature of fields in a numerical example 1 of the first embodiment of the optical scanner of the present invention.
Figure 17:
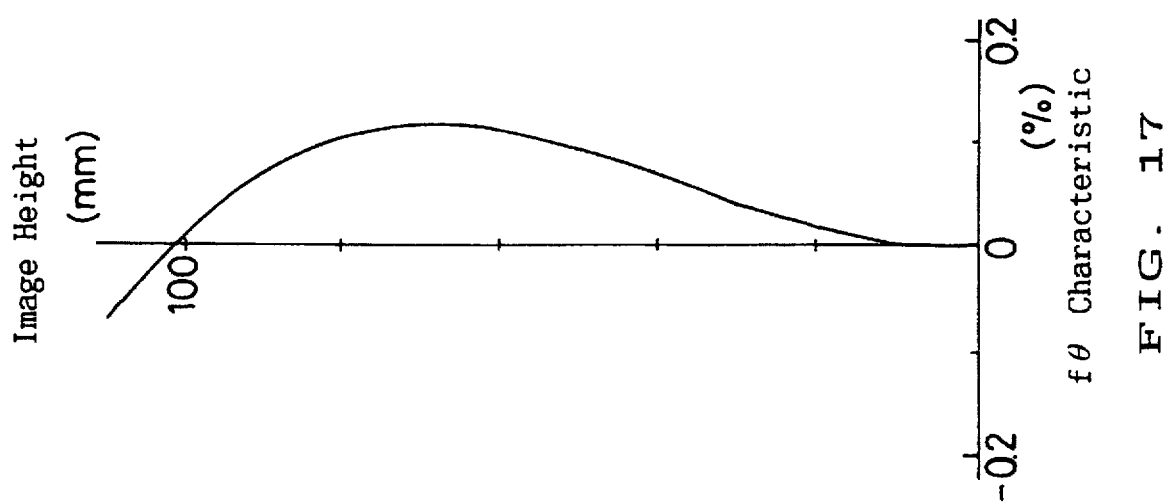
FIG. 17 is a graph illustrating the fθ characteristic in the numerical example 1 of the first embodiment of the optical scanner of the present invention.
Figure 18:
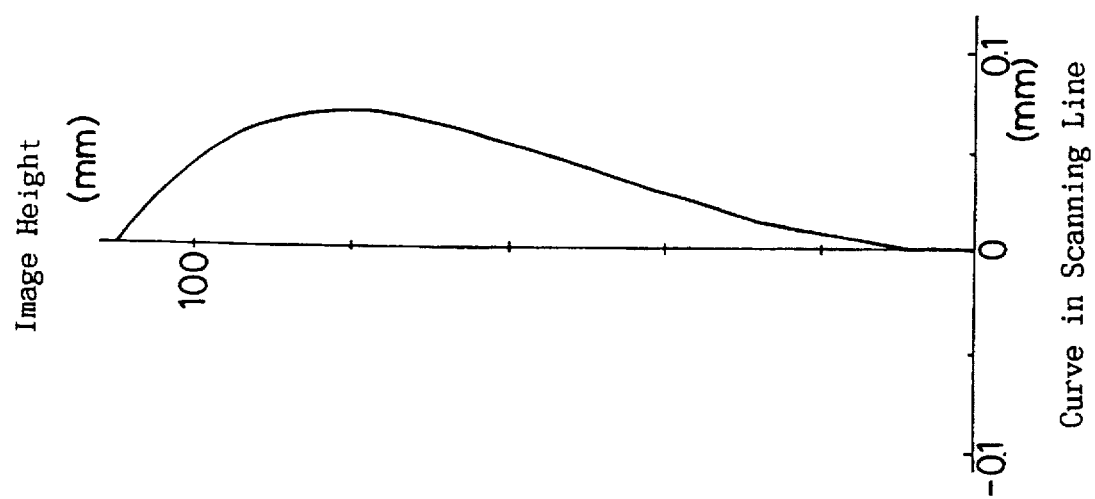
FIG. 18 is a graph illustrating an amount of remained bowing in the numerical example 1 of the first embodiment of the optical scanner of the present invention.

Operation of the optical scanner of the first embodiment with the above mentioned structure is described with reference to FIGS. 1 to 3. A light beam from the semiconductor laser 1 becomes a divergent light beam in the numerical examples (1) to (12), a parallel light beam in the numerical example (13) and a convergent light beam in the numerical example (14) by means of the axially symmetrical lens 2. Then the light beam is converged only in the sub scanning direction by means of the cylindrical lens 3, reflected by the reflecting mirror 4, and focused on the reflecting surface of the polygon mirror 5 as a line image. Owing to the rotation of the polygon mirror 5 about the center of rotation axis 6, the polygon mirror 5 in conjunction with the first curved mirror 7 and the second curved mirror 8 scans and focuses the ling image on surface 9. In this regard, curvature of field in both the main scanning direction and the sub scanning direction and the fθ characteristic are preferably compensated by the first curved mirror 7 and the second curved mirror 8.. Further, a decentering and a tilt of the first curved mirror 7 and of the second curved mirror 8 compensate for the bowing generated by the oblique incidence to the polygon mirror 5. FIGS. 16 to 18 show the curvature of field, the fθ characteristic and the amount of remaining bowing in the numerical example (1). As to the curvature of field described in FIG. 16, the curvature of field in the main scanning direction represents the amount of dislocation of the paraxial focus position from the surface to be scanned in the direction of the optical axis at a respective image height with respect to cross-section in the main scanning direction. Similarly, the curvature of field in the sub scanning direction represents the amount of disclocation of the paraxial focus position from the surface to be scanned in the direction of the optical axis at a respective image height with respect to cross-section in the sub scanning direction. In general, the curvature of field is shown in a graph with the ordinate describing the image height at the surface to be scanned and the abscissa describing the curvature of field. The fθ characteristic described in FIG. 17 is an amount defined by the following formula $$f\theta \text{ characteristic} = \frac{H - \theta \times \frac{W}{\theta°}}{\theta \times \frac{W}{\theta°}} \times 100$$

wherein θ denotes the deflection angle of the optical deflector described with the scanning center as the origin, H denotes the image height at the surface to be scanned, W denotes the effective scanning width, and θ° denotes the deflecting angle of the optical deflector corresponding to the effective scanning width. In general, the fθ characteristic is shown in a graph with the ordinate describing the image height at the surface to be scanned and the abscissa describing the fθ characteristic. The amount of remaining bowing described in FIG. 18 is an amount to show the curve in scanning line at the surface to be scanned with respect to the sub scanning direction. In general, the amount of remaining bowing is shown in a graph with the ordinate describing the image height at the surface to be scanned (the image height in the main scanning direction) and the abscissa describing the amount of dislocation in the sub scanning direction. Further, by using a semiconductor laser 1 of which wavelength is changeable and controlling the wavelength, the size of a spot on the surface to be scanned 9 can be optionally selected.

Figure 4:
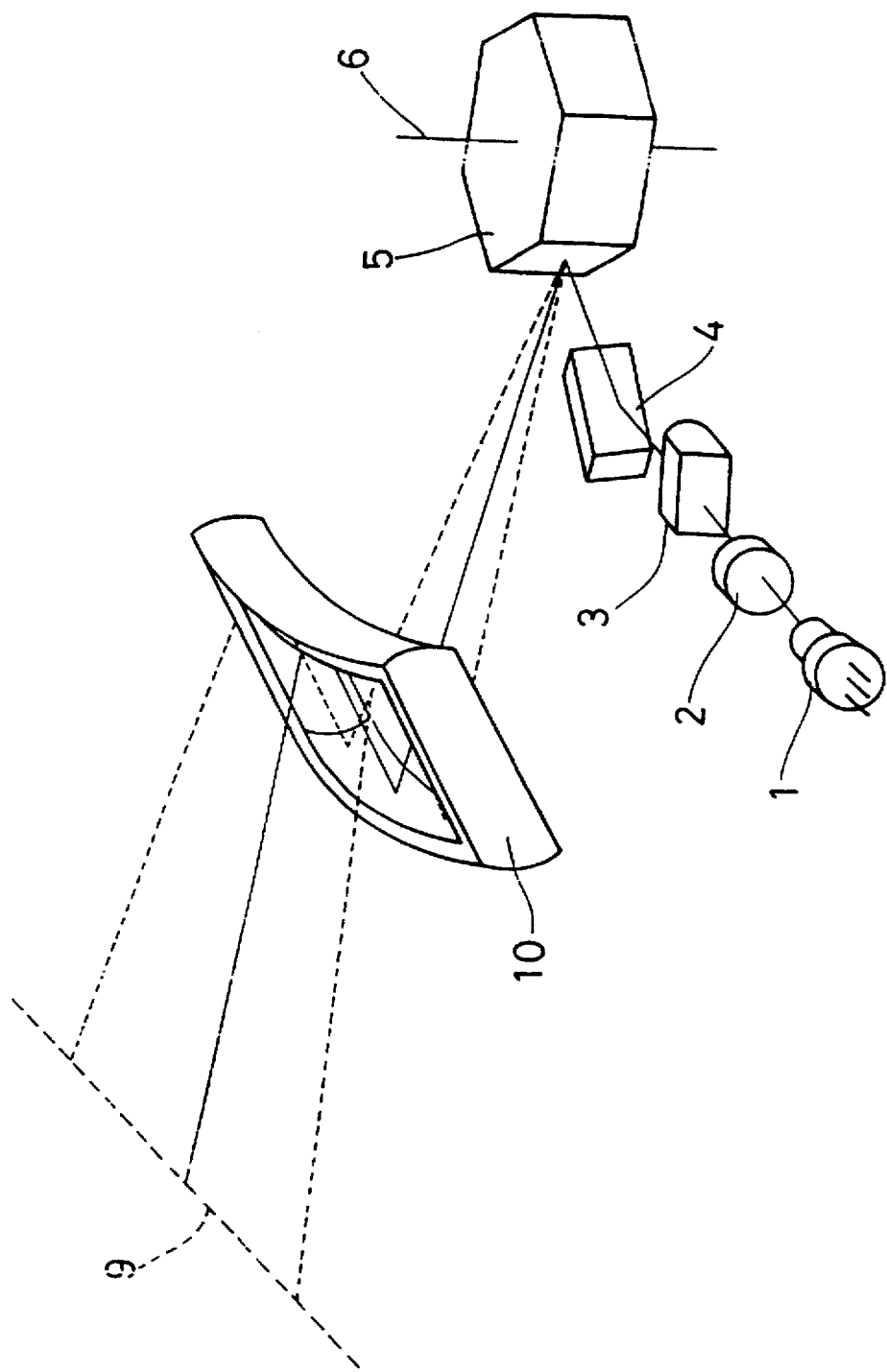
FIG. 4 is a perspective view illustrating another modified structure of the first embodiment of the optical scanner of the present invention.

A modified structure of the first embodiment of the optical scanner is illustrated in FIG. 4. The optical scanner in FIG. 4 has an integrated member 10 in place of the first curved mirror 7 and the second curved mirror 8 with the shape and the arrangement described in the above mentioned numerical examples (1) to (14). Operational procedure is the same as the embodiment already explained above, however, by using a second image formation optical system in the form of the integrated member, a lower cost can be achieved.

Figure 5:
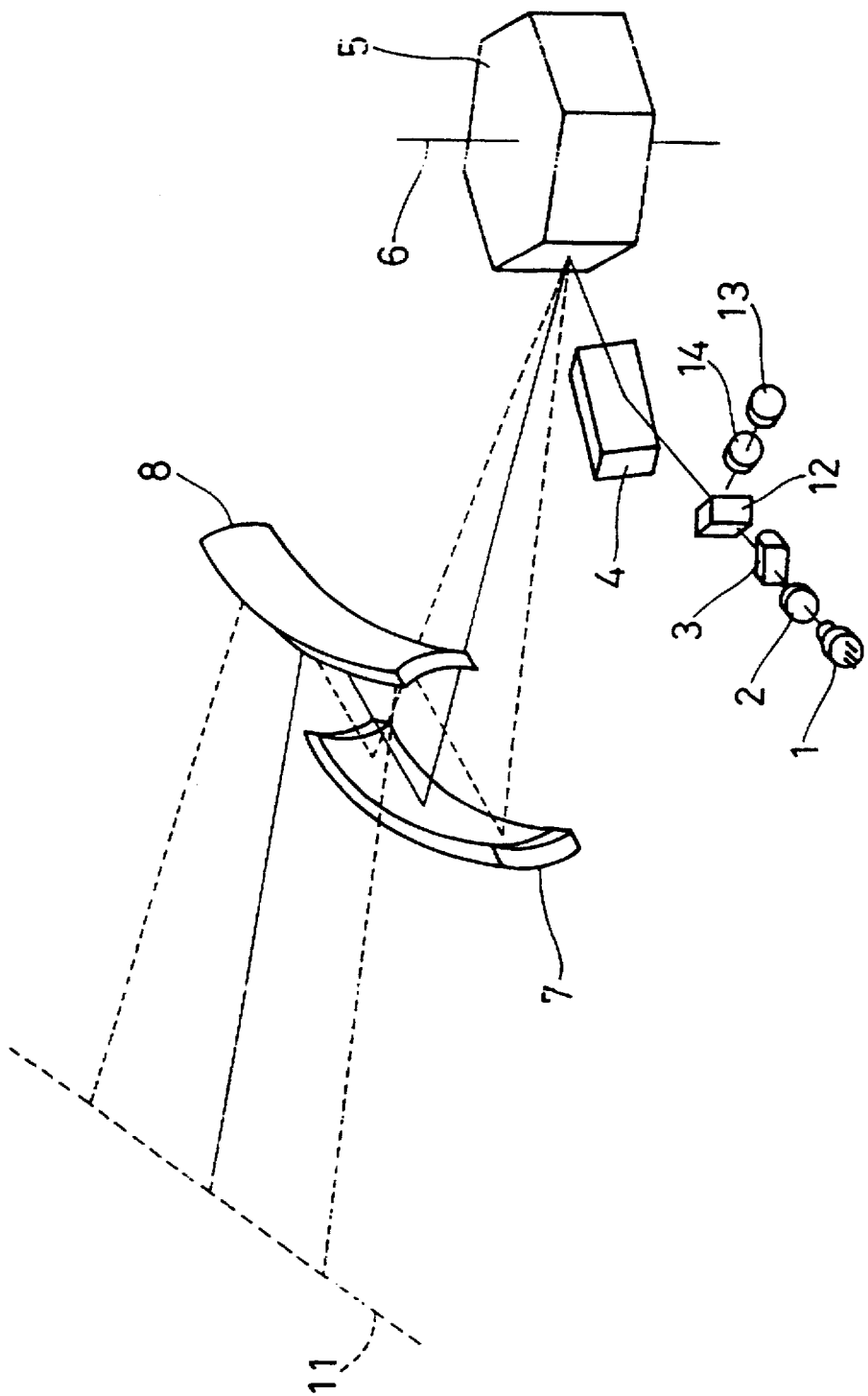
FIG. 5 is a perspective view illustrating a structure of an image reading apparatus using the optical scanner of the first embodiment of the present invention.

An example of an image reading apparatus using the optical scanner of the first embodiment is illustrated in FIG. 5. Numerals 1 to 8 denote the elements substantially the same as those of the optical scanner of the first embodiment illustrated in FIG. 1. Numeral 11 denotes a surface to be read. Numeral 12 denotes a half mirror to pass through the light beam from the light source unit 1 and reflect the returned light from the surface to be read 11 to a detecting optical system 14. Numeral 13 denotes a detector. The detecting optical system 14 guides the returned light to the detector 13. By using the optical scanner of the above mentioned first embodiment, the image reading apparatus with a compact structure and a high resolution can be realized at a low cost.

(Second Embodiment)

Figure 6:
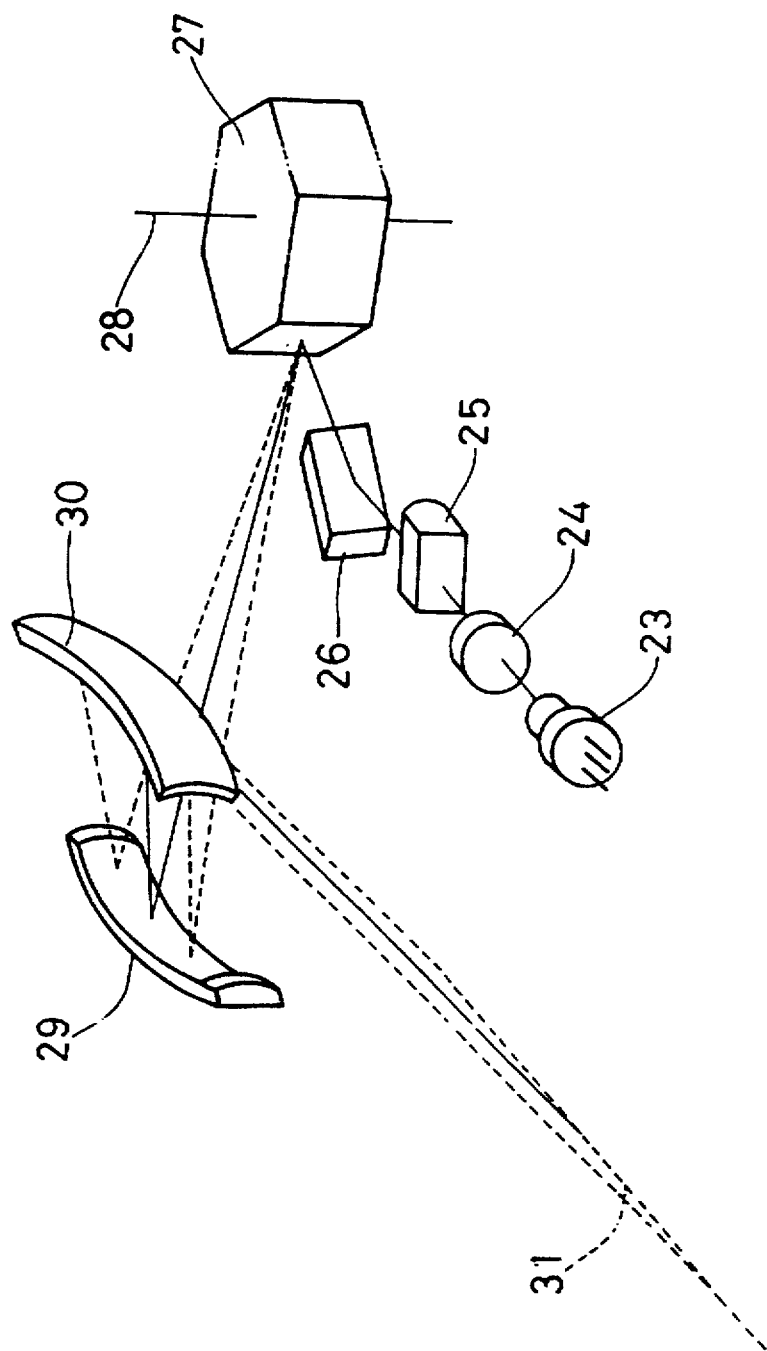
FIG. 6 is a perspective view illustrating a structure of a second embodiment of the optical scanner of the present invention.
Figure 7:
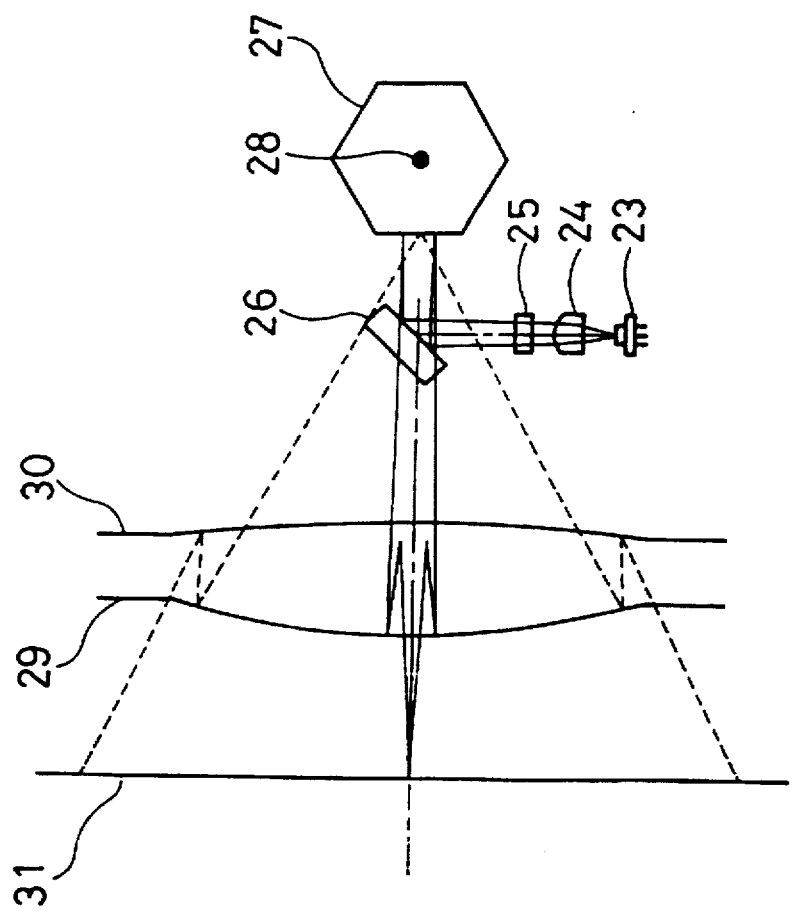
FIG. 7 is a plan view illustrating an arrangement in the main scanning plane of the second embodiment of the optical scanner of the present invention.

A second embodiment of an optical scanner in accordance with the present invention is described with reference to FIGS. 6 to 8. In FIG. 6, the optical scanner of the second embodiment comprises a semiconductor laser 23 serving as a light source, an axially symmetrical lens 24, a cylindrical lens 25 having a refractive power only in the sub scanning direction and a reflecting mirror 26 serving as a first image formation optical system, a polygon mirror 27 rotatimg about a center axis 28 serving as an optical deflector, a first curved mirror 29 and a second curved mirror 30 serving as a second image formation optical system. Numeral 31 denotes a surface to be scanned.

As to the surface shape, the first curved mirror 29 has a saddle shaped toric surface with a concave shape in the main scanning direction and a convex shape in the sub scanning direction in the numerical examples (15) to (19) and is defined by the formula (8) as in the first embodiment. The second curved mirror 30 has a cylindrical surface or a barrel shaped toric surface with a concave shape in the sub scanning direction in the numerical examples (15) to (19) and is defined by the formula (9) as in the first embodiment.

Figure 8:
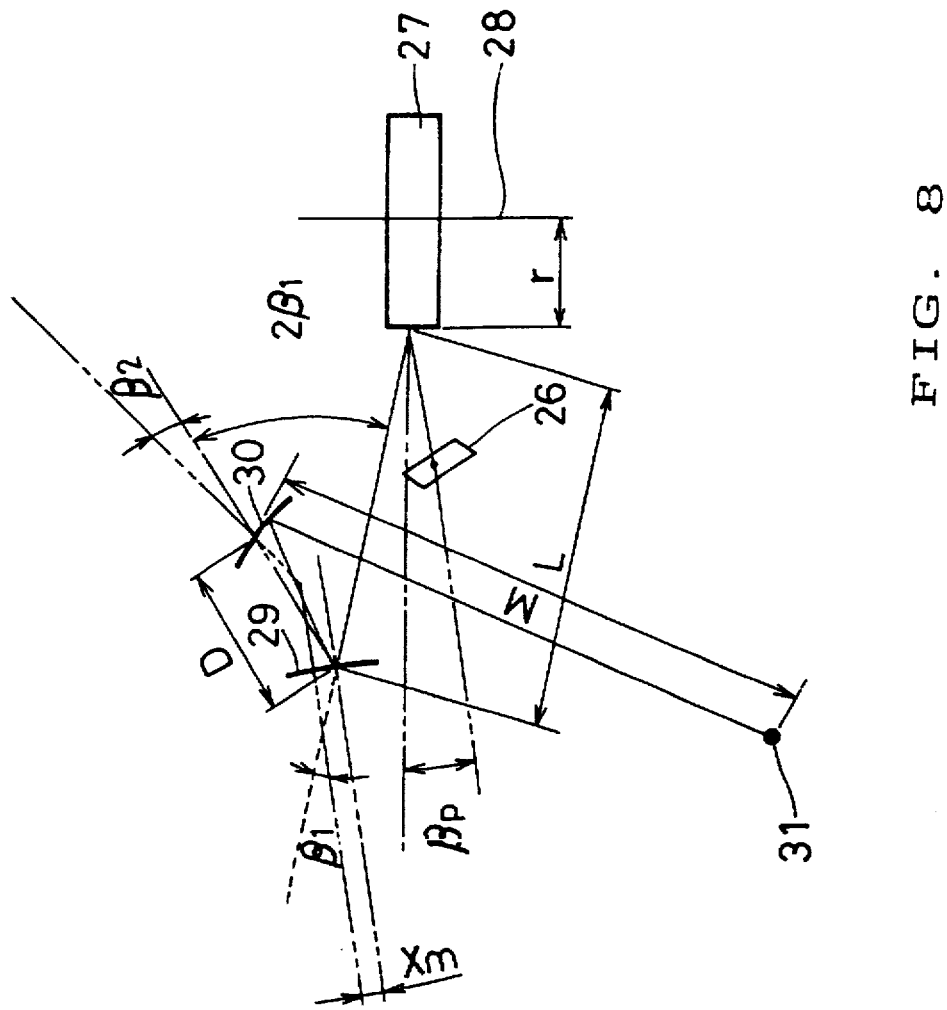
FIG. 8 is a section view illustrating the sub scanning section of the second embodiment of the optical scanner of the present invention.

In FIG. 8, L (mm) denotes the distance between the deflecting point of the polygon mirror 27 and the reflecting point of the first curved mirror 29; D (mm) denotes the distance between the reflecting point of the first curved mirror 29 and the apex of the second curved mirror 30; M (mm) denotes the distance between the reflecting point of the second curved mirror 30 and the surface to be scanned 31; r (mm) denotes the distance between the reflecting point of the polygon mirror 27 and the center of rotation axis 28; with the premise that the direction shown in FIG. 8 is positive, $x_m$ (mm) denotes the amount of decentering from the reflecting point of the apex of the first curved mirror 29 in the sub scanning direction; $\beta_P$ (deg) denotes the angle determined by the normal of the reflecting plane of the polygon mirror 27 and the optical axis of the reflecting mirror 26; $\beta_1$ (deg) denotes the angle determined by the normal of the first curved mirror 29 at its apex and the reflected light beam reflected by the polygon mirror 27; and $\beta_2$ (deg) denotes the angle determined by the normal of the second curved mirror 30 at its apex and the line connecting the reflecting point of the first curved mirror 29 and the apex of the second curved mirror 30, in other words, the line to determine the angle of $2\beta_1$ with the optical axis of the polygon mirror 27 and the first curved mirror 29 as illustrated in FIG. 8. As to $\beta_P$, $\beta_1$, $\beta_2$, clockwise direction in FIG. 8 is defined to be positive.

Concrete examples of numerals will be described as the numerical examples (15) to (19) in Tables 15 to 19. In the Tables, $f_m$ (mm) denotes the focal length of the second image information optical system in the main scanning direction, and $f_{m2}$ (mm) denotes the focal length of the second curved mirror in the main scanning direction. The effective scanning width in the numerical examples is 220 mm.

Numerical Example 15

TABLE 15

| L | 77.0 | D | 25.0 |
|---|---|---|---|
| M | 128.6 | r | 17.3 |
| $x_m$ | −30.0 | $\beta_p$ | 8.5 |
| $\beta_1$ | −8.0 | $\beta_2$ | −25.0 |
| $f_m$ | 123.6 | $f_{m2}$ | ∞ |
| $R_{1H}$ | 247.1 | $R_{2H}$ | ∞ |
| $R_{1v}$ | −302.1 | $R_{2v}$ | −99.4 |
| $K_1$ | 0.00000 | $K_2$ | 0.00000 |
| $D_1$ | −1.20277e-08 | $D_2$ | 0.00000 |
| $E_1$ | 9.40840e-14 | $E_2$ | 0.00000 |
| $F_1$ | 0.00000 | $F_2$ | 0.00000 |
| $G_1$ | 0.00000 | $G_2$ | 0.00000 |

Numerical Example 16

TABLE 16

| L | 78.6 | D | 25.0 |
|---|---|---|---|
| M | 127.9 | r | 17.3 |
| $x_m$ | 0.0 | $\beta_p$ | 8.5 |
| $\beta_1$ | −14.0 | $\beta_2$ | −18.0 |
| $f_m$ | 123.4 | $f_{m2}$ | ∞ |
| $R_{1H}$ | 246.8 | $R_{2H}$ | ∞ |
| $R_{1v}$ | −295.2 | $R_{2v}$ | −100.1 |
| $K_1$ | 0.00000 | $K_2$ | 0.00000 |
| $D_1$ | −1.20762e-08 | $D_2$ | 0.00000 |
| $E_1$ | 9.45357e-14 | $E_2$ | 0.00000 |
| $F_1$ | 0.00000 | $F_2$ | 0.00000 |
| $G_1$ | 0.00000 | $G_2$ | 0.00000 |

Numerical Example 17

TABLE 17

| L | 78.6 | D | 25.0 |
|---|---|---|---|
| M | 128.1 | r | 17.3 |
| $x_m$ | 0.0 | $\beta_p$ | 8.5 |
| $\beta_1$ | −15.0 | $\beta_2$ | −13.0 |
| $f_m$ | 122.8 | $f_{m2}$ | ∞ |
| $R_{1H}$ | 245.5 | $R_{2H}$ | ∞ |
| $R_{1v}$ | −280.3 | $R_{2v}$ | −96.9 |
| $K_1$ | 0.00000 | $K_2$ | 0.00000 |
| $D_1$ | −2.21598e-08 | $D_2$ | −9.44911e-09 |
| $E_1$ | 1.58862e-12 | $E_2$ | 1.18739e-12 |
| $F_1$ | −2.70263e-17 | $F_2$ | 0.00000 |
| $G_1$ | 8.80832e-22 | $G_2$ | 0.00000 |

Numerical Example 18

TABLE 18

| L | 78.6 | D | 25.0 |
|---|---|---|---|
| M | 122.1 | r | 17.3 |
| $x_m$ | 0.0 | $\beta_p$ | 8.5 |
| $\beta_1$ | −15.0 | $\beta_2$ | −8.0 |
| $f_m$ | 125.9 | $f_{m2}$ | ∞ |
| $R_{1H}$ | 251.8 | $R_{2H}$ | ∞ |
| $R_{1v}$ | −281.5 | $R_{2v}$ | −93.7 |
| $K_1$ | 0.00000 | $K_2$ | 0.00000 |
| $D_1$ | −2.62233e-08 | $D_2$ | −1.40113e-08 |
| $E_1$ | 1.56673e-12 | $E_2$ | 1.18027e-12 |
| $F_1$ | −1.83413e-17 | $F_2$ | 0.00000 |
| $G_1$ | 2.09812e-22 | $G_2$ | 0.00000 |

Numerical Example 19

TABLE 19

| L | 109.5 | D | 25.0 |
|---|---|---|---|
| M | 41.9 | r | 17.3 |
| $x_m$ | −10.0 | $\beta_p$ | 8.5 |
| $\beta_1$ | −18.0 | $\beta_2$ | −8.0 |
| $f_m$ | 167.1 | $f_{m2}$ | 500.0 |
| $R_{1H}$ | 476.8 | $R_{2H}$ | −1000.0 |
| $R_{1v}$ | −1401.2 | $R_{2v}$ | −62.1 |
| $K_1$ | 0.00000 | $K_2$ | 0.00000 |
| $D_1$ | 4.49696e-09 | $D_2$ | 0.00000 |
| $E_1$ | 5.22842e-15 | $E_2$ | 0.00000 |
| $F_1$ | 0.00000 | $F_2$ | 0.00000 |
| $G_1$ | 0.00000 | $G_2$ | 0.00000 |

Figure 19:
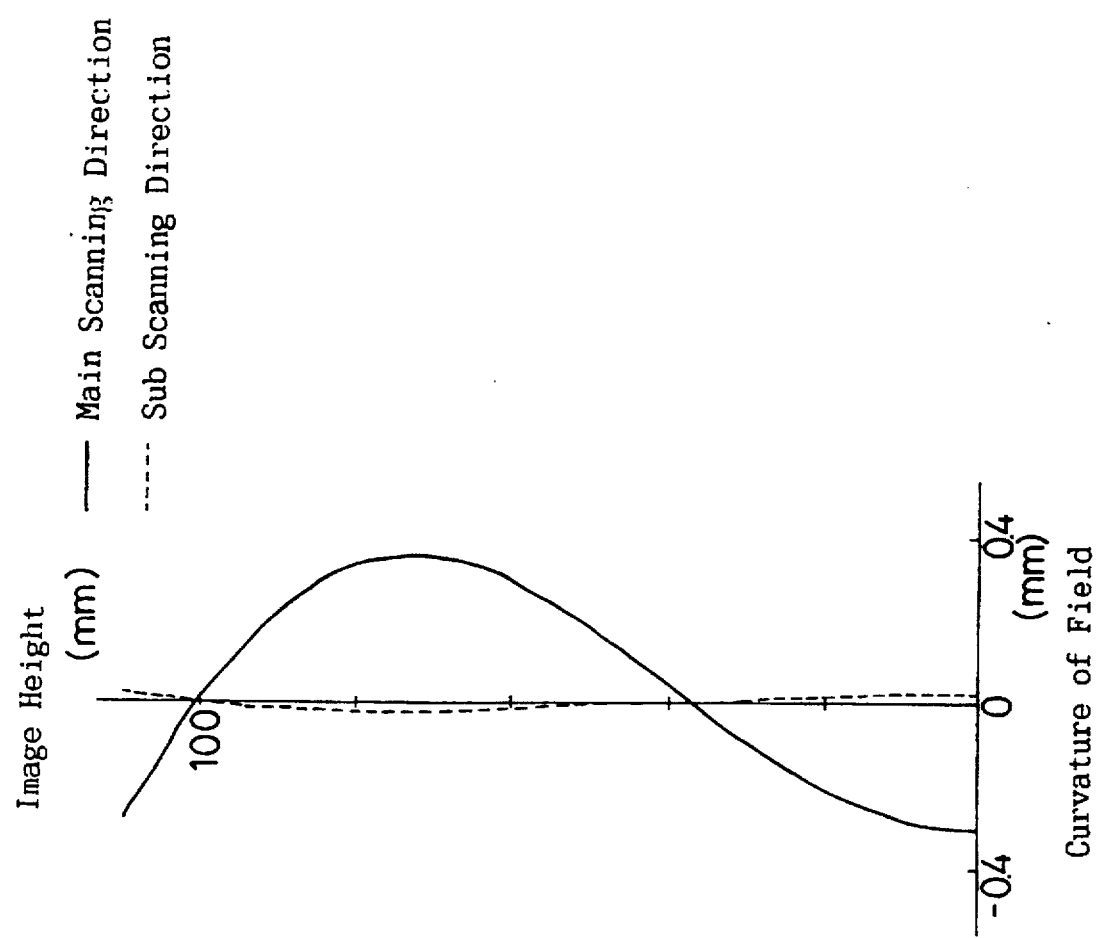
FIG. 19 is a graph illustrating amounts of curvature of field in a numerical example 15 of the second embodiment of the optical scanner of the present invention.
Figure 20:
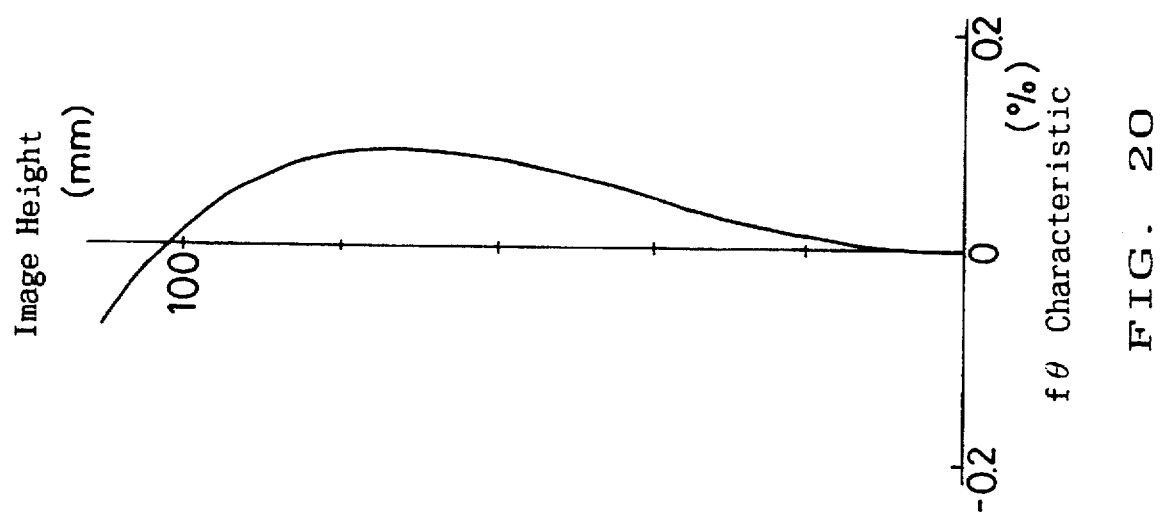
FIG. 20 is a graph illustrating the fθ characteristic in the numerical example 15 of the second embodiment of the optical scanner of the present invention.
Figure 21:
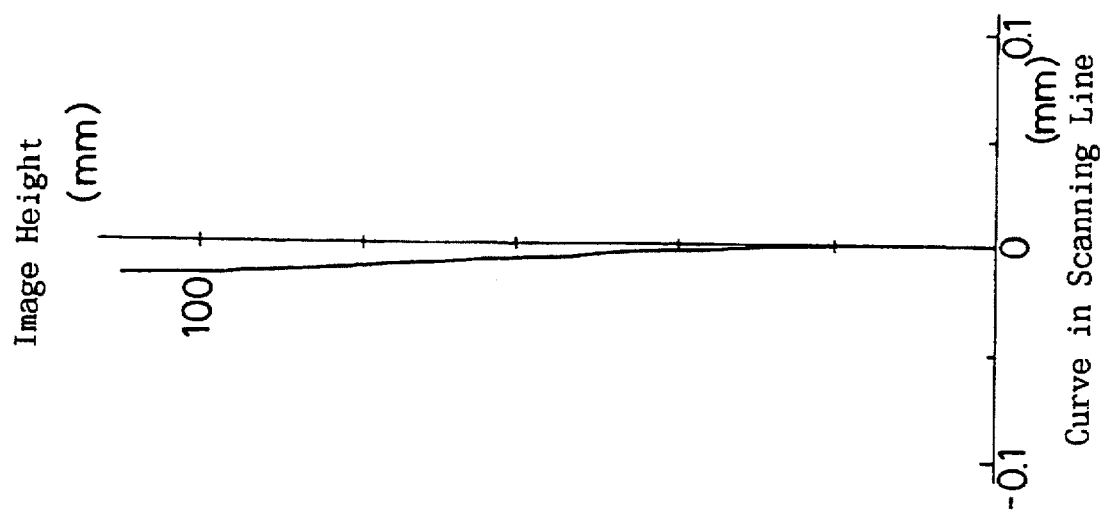
FIG. 21 is a graph illustrating an amount or remained bowing in the numerical example 15 of the second embodiment of the optical scanner of the present invention.

Operation of the optical scanner of the second embodiment with the above mentioned structure is described with reference to FIGS. 6 to 8. A light beam from the semiconductor laser 23 becomes a divergent light beam in the numerical examples (15) to (18) and a convergent light beam in the numerical example (19) by means of the axially symmetrical lens 24. Then, the light beam is converged only in the sub scanning direction by means of the cylindrical lens 25, reflected by the reflecting mirror 26, and focused on the reflecting surface of the polygon mirror 27 as a line image. Owing to the rotation of the polygon mirror 27 about the center of rotation axis 28, the polygon mirror 27 in conjunction with the first curved mirror 29 and the second curved mirror 30 scans and focuses the ing image on surface 31. In this regard, curvature of field in both the main scanning direction and the sub scanning direction and the fθ characteristic are preferably compensated by the first curved mirror 29 and the second curved mirror 30. Further, a decentering and a tilt of the first curved mirror 29 and of the second curved mirror 30 compensate for the bowing generated by the oblique incidence to the polygon mirror 27. FIGS. 19 to 21 show the curvature of field, the fθ characteristic and the amount of remaining bowing in the numerical example (15). As to the curvature of field described in FIG. 19, the curvature of field in the main scanning direction represents the amount of dislocation of the paraxial focus position from the surface to be scanned in the direction of the optical axis at a respective image height with respect to cross-section in the main scanning direction. Similarly, the curvature of field in the sub scanning direction represents the amount of dislocation of the paraxial focus position from the surface to be scanned in the direction of the optical axis at a respective image height with respect to cross-section in the sub scanning direction. In general, the curvature of field is shown in a graph with the ordinate describing the image height at the surface to be scanned and the abscissa describing the curvature of field. The fθ characteristic described in FIG. 20 is an amount defined by the following formula $$f\theta \text{ characteristic} = \frac{H - \theta \times \frac{W}{\theta°}}{\theta \times \frac{W}{\theta°}} \times 100$$

wherein θ denotes the deflection angle of the optical deflector described with the scanning center as the origin, H denotes the image height at the surface to be scanned, W denotes the effective scanning width, and θ° denotes the deflecting angle of the optical deflector corresponding to the effective scanning width. In general, the fθ characteristic is shown in a graph with the ordinate describing the image height at the surface to be scanned and the abscissa describing the fθ characteristic. The amount of remaining bowing described in FIG. 21 is an amount to show the curve in scanning line at the surface to be scanned with respect to the sub scanning direction. In general, the amount of remaining bowing is shown in a graph with the ordinate describing the image height at the surface to be scanned (the image height in the main scanning direction) and the abscissa describing the amount of dislocation in the sub scanning direction. Further, by using a semiconductor laser 23 of which wavelength is changeable and controlling the wavelength, the size of a spot on the surface to be scanned 31 can be optionally selected.

Figure 9:
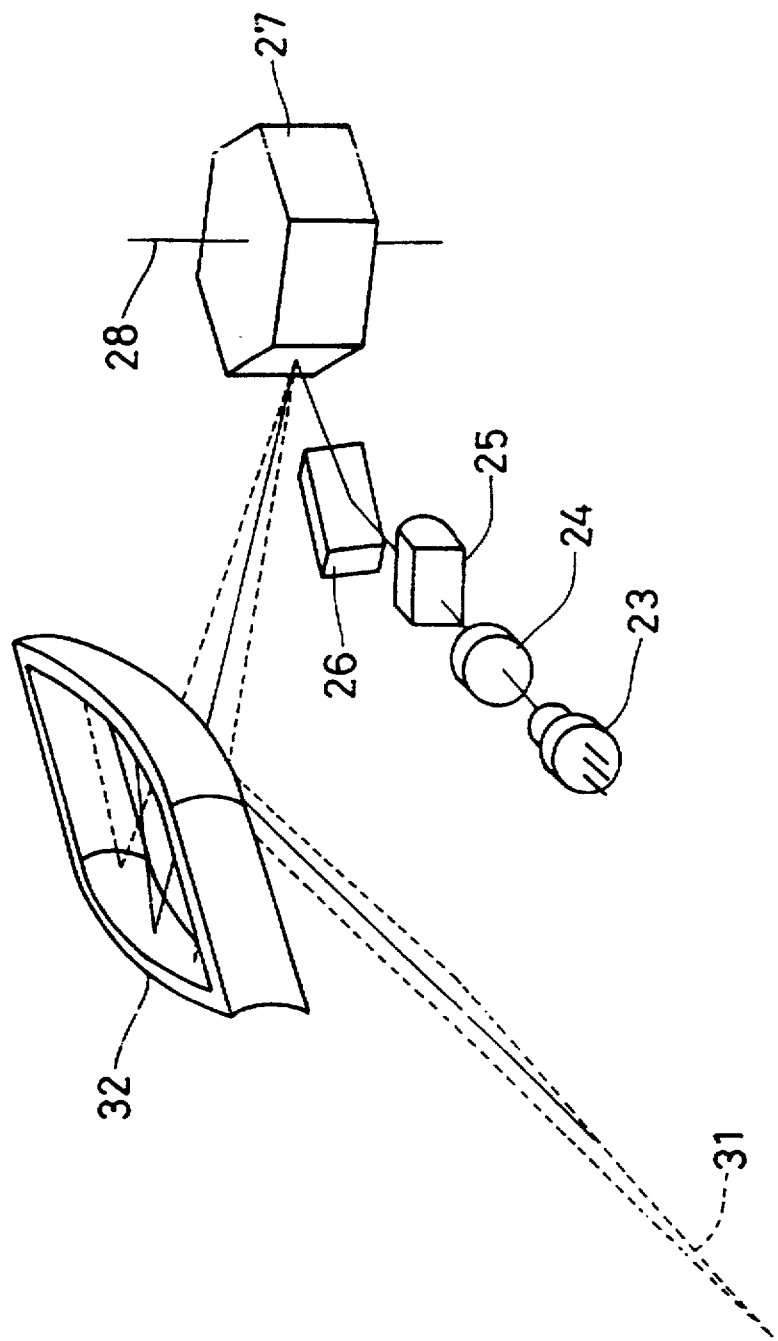
FIG. 9 is a perspective view illustrating a modified structure of the second embodiment of the optical scanner of the present invention.

A modified structure of the second embodiment of the optical scanner is illustrated in FIG. 9. The optical scanner in FIG. 9 has an integrated member 32 in place of the first curved mirror 29 and the second curved mirror 30 with the shape and the arrangement described in the above mentioned numerical examples (15) to (19). Operational procedure is the same as the embodiment already explained above. By using a second image formation optical system with an integrated member, a lower cost can be achieved.

Figure 10:
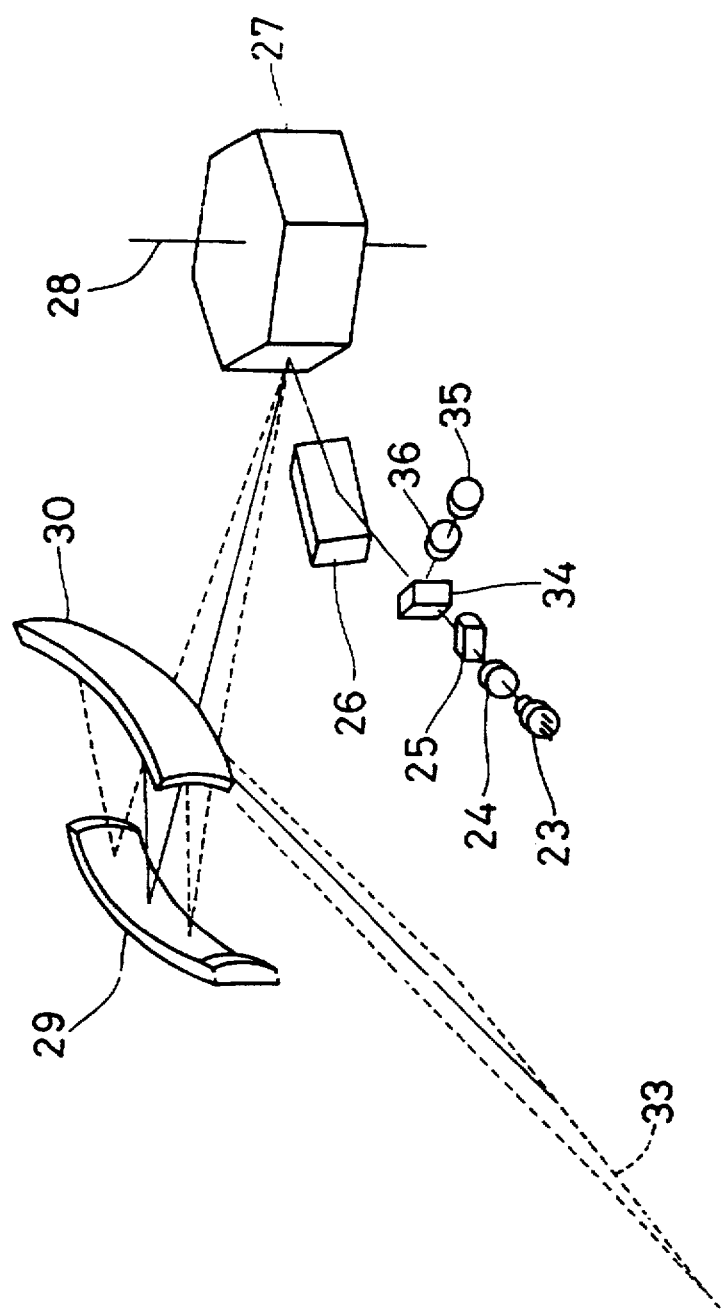
FIG. 10 is a perspective view illustrating a structure of an image reading apparatus using the optical scanner of the second embodiment of the present invention.

An example of an image reading apparatus using the optical scanner of the second embodiment is illustrated in FIG. 10. In FIG. 10, numerals 23 to 30 denote the elements substantially the same as those of the optical scanner or the second embodiment illustrated in FIG. 6. Numeral 33 denotes a surface to be read. Numeral 34 denotes a half mirror to pass through the light beam from the light source unit 23 and to reflect the returned light from the surface to be read 33 to the detecting optical system 36. Numeral 35 denotes a detector. Numeral 36 denotes a detecting optical system to guide the returned light to the detector 35. By using the optical scanner of the above mentioned second embodiment,e image reading apparatus with compact structure and high resolution can be realized at a low cost.

(Third Embodiment)

Figure 11:
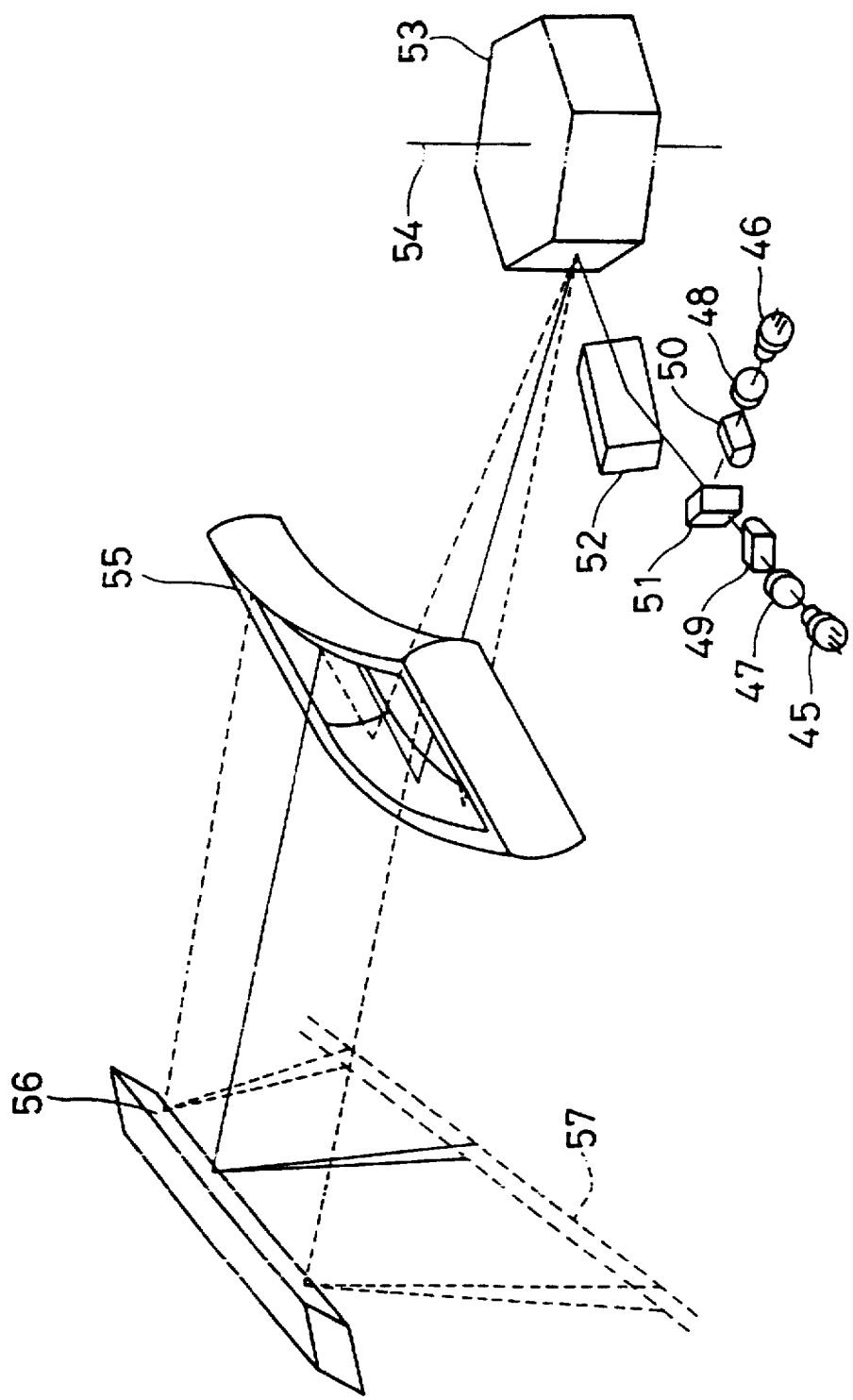
FIG. 11 is a perspective view illustrating a structure of a third embodiment of the optical scanner of the present invention.

A third embodiment of an optical scanner in accordance with the present invention is described with reference to FIG. 11. In FIG. 11, the optical scanner of the third embodiment comprises a first light source 45 which emits a light beam of a wavelength λ 1 and a second light source 46 which emits a light beam of a wavelength λ2, and which together form a light source unit, a first axially symmetrical lens 47 to convert the light beam from the first light source 45 to a divergent light beam, a parallel light beam or a convergent light beam, a second axially symmetrical lens 48 to convert the light beam from the second light source 46 to a divergent light beam, a parallel light beam or a convergent light beam, a first cylindrical lens 49 having a refractive power only in the sub scanning direction to focus the light beam from the first light source 45 on the deflecting surface as a line image and a second cylindrical lens 50 having a refractive power only in the sub scanning direction to focus the light beam from the second light source 46 on the deflecting surface as a line image, a dichroic mirror 51 to pass through the light beam of wavelength λ1 but to reflect the light beam of the wavelength λ2 serving as light mixing means, a reflecting mirror 52 serving as a first image formation optical system, a polygon mirror 53 rotating about a center axis 54 serving as an optical deflector, a second image formation optical system 55, and a diffraction grating 56 to separate the mixed light beam to the light beam of wavelength λ1 and the light beam of wavelength λ2 as light separating means. Numeral 57 denotes a surface to be scanned. The second image formation optical system 55 is an integrated member in place of the first curved mirror and the second curved mirror with a shape and an arrangement illustrated in the numerical examples (1) to (14) of the first embodiment.

Operation of the optical scanner of the third embodiment with the above mentioned structure is now described. A light beam mixed by the dichroic mirror 51 from two light beams with different wavelengths is scanned by the polygon mirror 53 and converted to a convergent light beam by means of the second image formation optical system 55 and separated to two kinds of light beams by means of diffraction grating 56 to be focused on the surface 57 which is to be scanned. Therefore, two lines can be scanned simultaneously. Since the second image formation optical system 55 consists of a mirror, no chromatic aberration is generated. Subsequently, the light beams separated by means of the diffraction grating 56 are preferably focused on the surface to be scanned 57. Although the dichroic mirror 51 is used herein as the light mixing means, a half mirror can be used as well. Further, a dichroic mirror can be used as light separating means in place of the diffraction grating. Further, although scanning in two lines with the light separating means is explained in the third embodiment, a multi-wavelength scanning can also be conducted without the light separating means.

Figure 12:
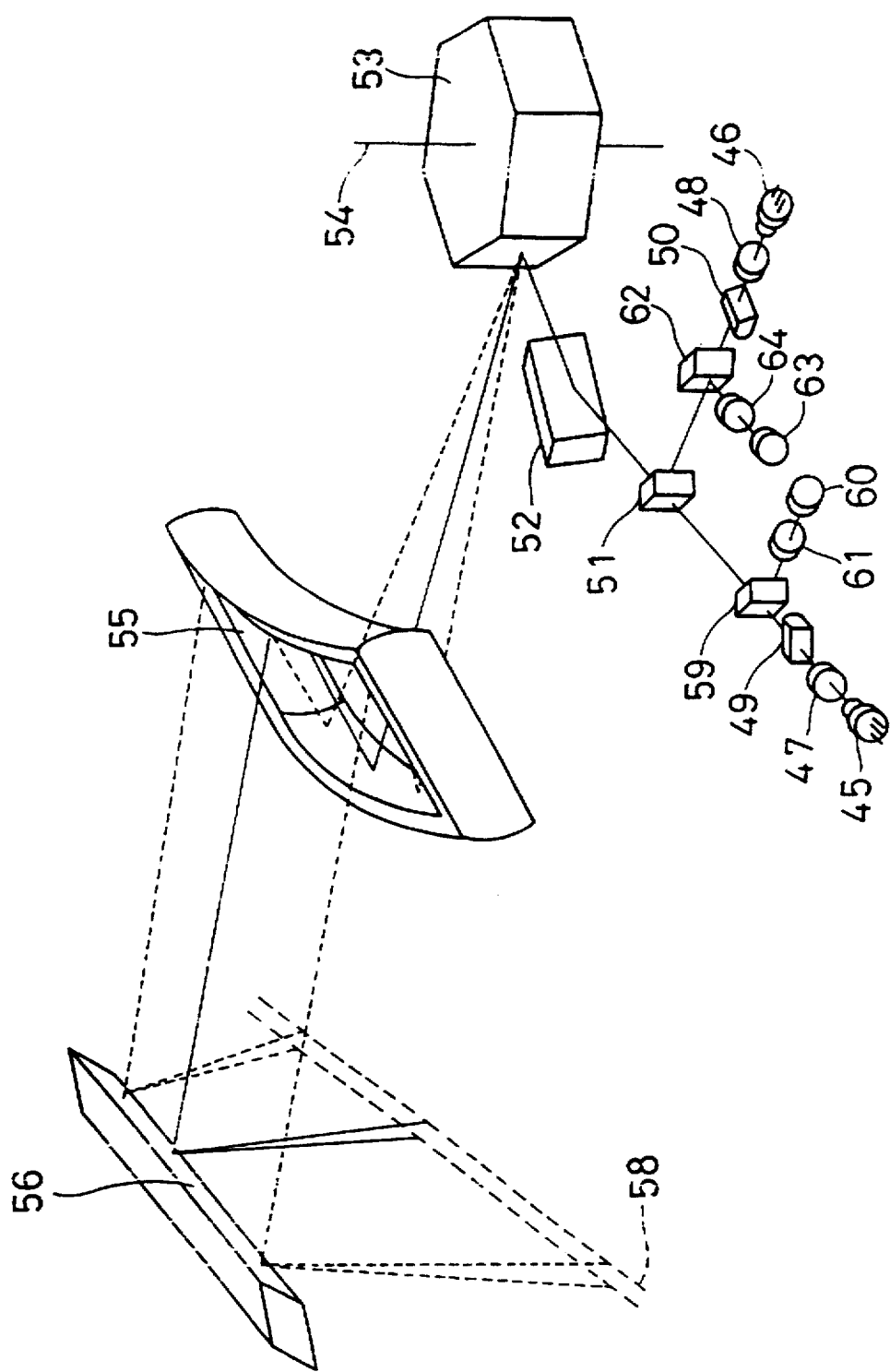
FIG. 12 is a perspective view illustrating a structure of an image reading apparatus using the optical scanner of the third embodiment of the present invention.

An example of an image reading apparatus using the optical scanner of the third embodiment is illustrated in FIG. 12. Numerals 45 to 56 denote the elements substantially the same as those of the optical scanner of the third embodiment illustrated in FIG.. 11. Numeral 58 denotes a surface to be read. Numeral 59 denotes a first half mirror to pass through the light beam from the first light source 45 and to reflect the returned light from the surface to be read 58 to the first detecting optical system 61. Numeral 60 denotes a first detector. The first detecting optical system 61 guides the returned light to the first detector 60. Numeral 62 denotes a second half mirror to pass through the light beam from the second light source 46 and to reflect the returned light from the surface to be read 58 to the second detecting optical system 64. Numeral 63 denotes a second returned light to the second detector 63. By using the optical scanner of the above mentioned third embodiment, image reading apparatus with compact structure and high resolution can be realized at a low cost.

(Fourth Embodiment)

Figure 13:
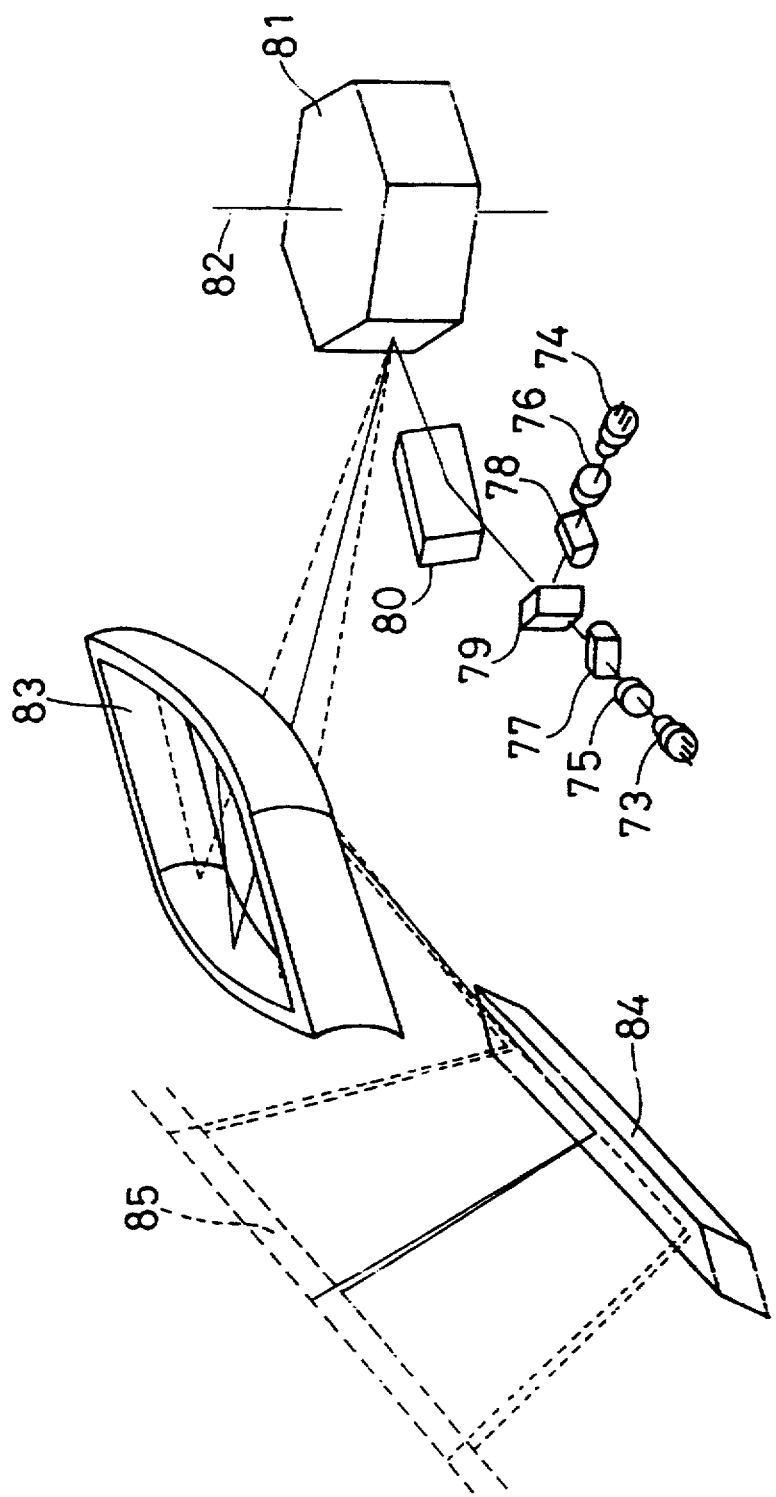
FIG. 13 is a perspective view illustrating a structure of a fourth embodiment of the optical scanner of the present invention.

A fourth embodiment of an optical scanner in accordance with the present invention is described with reference to FIG. 13. In FIG. 13, the optical scanner of the fourth embodiment comprises a first light source 73 which emits a light beam of a wavelength λ 1 and a second light source 74 which emits a light beam of a wavelength λ2 which serve as light sources, a first axially symmetrical lens 75 to convert the light beam from the first light source 73 to a divergent light beam, a parallel light beam or a convergent light beam, a second axially symmetrical lens 76 to convert the light beam from the second light source 74 to a divergent light beam, a parallel light beam or a convergent light beam, a first cylindrical lens 77 having a refractive power only in the sub scanning direction to focus the light beam from the first light source 73 on a deflecting surface as a line image and a second cylindrical lens 78 having a refractive power only in the sub scanning direction to focus the light beam from the second light source 74 on the deflecting surface as a line image, a dichroic mirror 79 to pass through the light beam of wavelength λ1 but to reflect the light beam of wavelength λ2 serving as light mixing means, a reflecting mirror 80 serving as a first image formation optical system, a polygon mirror 81 rotating about a center axis 82 serving as an optical deflector, a second image formation optical system 83, and a diffraction grating 84 to separate the mixed light beam to the light beam of wavelength λ1 and the light beam of wavelength λ2 serving as light separating means.

Numeral 85 denotes a surface to be scanned. The second image formation optical system 83 is an integrated member in place of the first curved mirror and the second curved mirror with a shape and an arragement illustrated in the numerical examples (15) to (19) of the second embodiment.

Operation of the optical scanner of the fourth embodiment with the above mentioned structure is now described. A light beam mixed by the dichroic mirror 79 from two light beams with different wavelengths is scanned by the polygon mirror 81 and converted to a convergent light beam by means of the second image formation optical system 83 and separated to two kinds of light beams by means of diffraction grating 84 to be focused on the surface to be scanned 85. Therefore, two lines can be scanned simultaneously. Since the second image formation optical system 83 consists of a mirror, no chromatic aberration generates. Subsequently, the light beams separated by means of the diffraction grating 84 are preferably focused on the surface 85 which is to be scanned. Although the dichroic mirror 79 is used herein as the light mixing means, a half mirror can be used as well. Further, a dichroic mirror can be used as a light separating means in place of the diffraction grating. Further, although scanning in two lines with a light separating means is explained in the fourth embodiment, a multi-wavelength scanning can also be conducted without light separating means.

Figure 14:
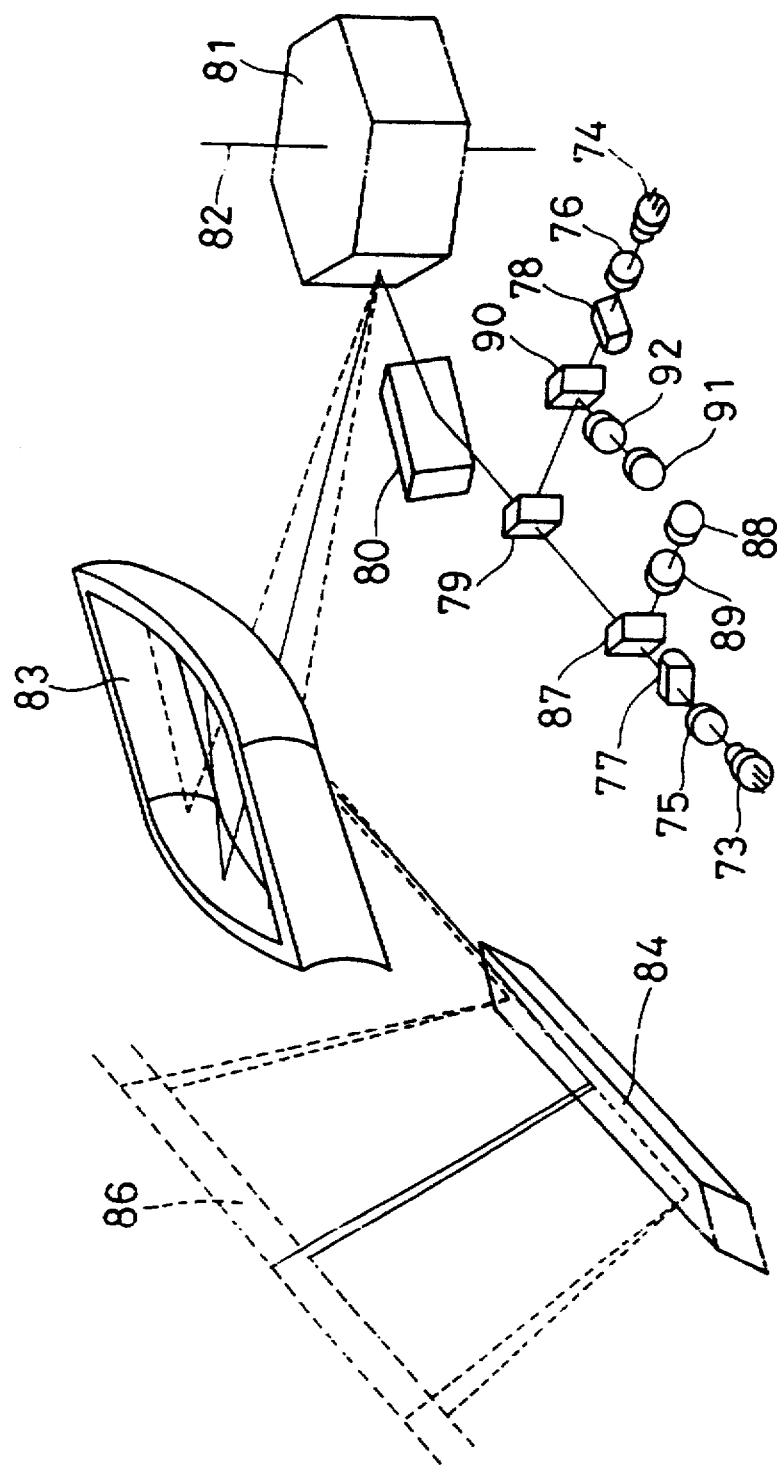
FIG. 14 is a perspective view illustrating a structure of an image reading apparatus using the optical scanner of the fourth embodiment of the present invention.

An example of an image reading apparatus using the optical scanner of the fourth embodiment is illustrated in FIG. 14. Numerals 73 to 84 denote the elements substantially the same as those of the optical scanner of the fourth embodiment illustrated in FIG. 13. Numeral 86 denotes a surface to be read. Numeral 87 denotes a first half mirror to pass through the light beam from the first light source 73 and to reflect the returned light from the surface 86 to the detecting optical system 89. Numeral 88 denotes a first detector. The first detecting optical system 89 guides the returned light to the first detector 88. Numeral 90 denotes a second half mirror to pass through the light beam from the second light source 74 and to reflect the returned light from the surface 86 to the second detecting optical system 92. Numeral 91 denotes a second detector. The second detecting optical system 92 guides the returned light to the second detector 91. By using the optical scanner of the above mentioned fourth embodiment, image reading apparatus with compact structure and high resolution can be realized at a low cost.

Figure 15:
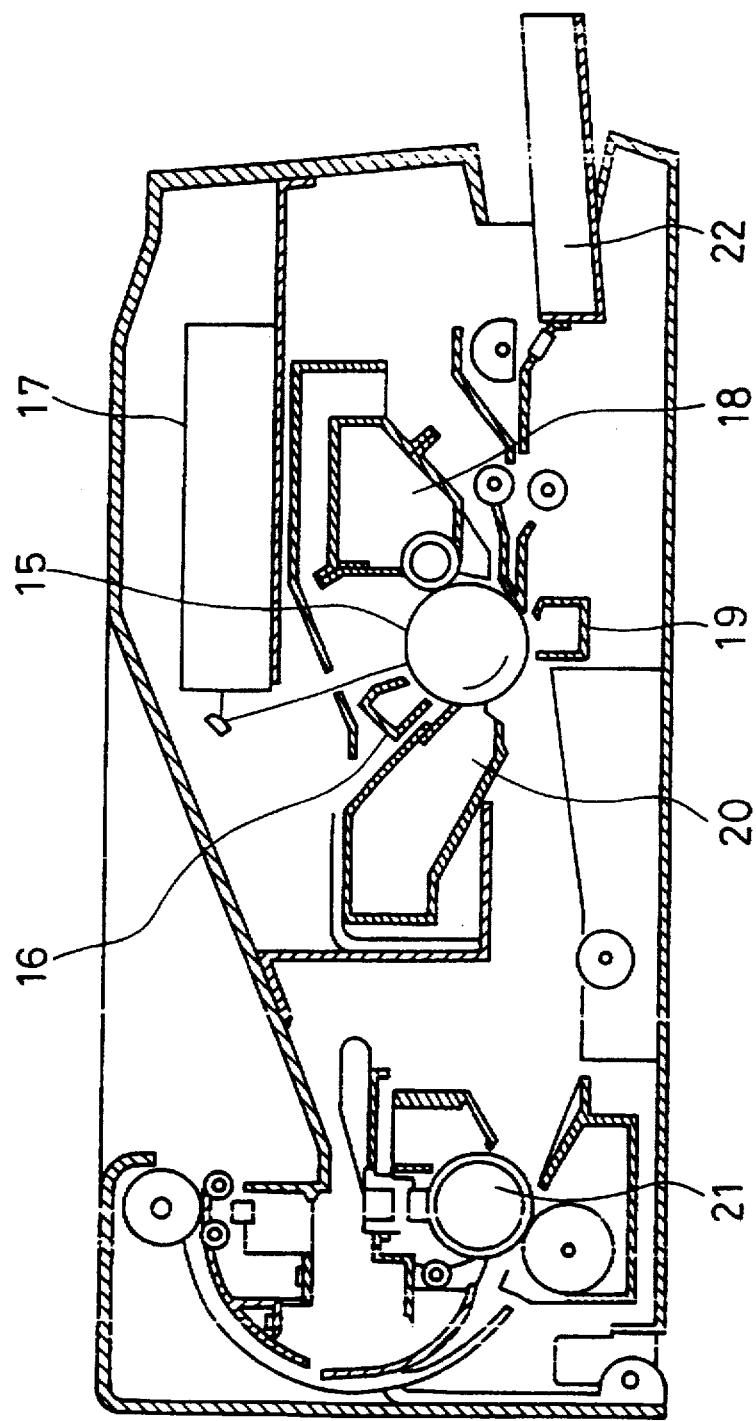
FIG. 15 is a cross-sectional side view illustrating a structure of an image forming apparatus using the optical scanner of the present invention.

An example of a structure of an image forming apparatus using the optical scanner of the present invention is illustrated in FIG. 15. The image forming apparatus of the present invention in FIG. 15 comprises a photosensitive drum 15 having a surface coated with photosensitive material to change electric charge by light beam irradiation, a corona charging unit 16 to fix electrostatic ions on the photosensitive material to be electrified, an optical scanner 17 to write printing information on the photosensitive drum 15, a developing unit 18 to fix a charged toner on the printed portion, a corona transfer unit 19 to transfer the fixed toner on paper, a cleaner 20 to remove residual toner, a print fixing unit 21 to fix the transfered toner on the paper and a paper feeding casette 22. The optical scanner 17 has the structure of any of the above mentioned embodiments. By using the optical scanner of any of the above mentioned embodiments, image forming apparatus with compact structure can be realized at a low cost.

As this invention can be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds are therefore intended to embraced by the claims.

What is claimed is:

1. An optical scanner comprising a light source unit, an optical deflector to scan a light beam from the light source unit, a first image formation optical system disposed between the light source unit and the optical deflector, and a second image formation optical system disposed between the optical deflector and a surface to be scanned, wherein the second image formation optical system comprises a first curved mirror having a toric surface with a concave shape in a main scanning direction, which is a direction a light beam is scanned in, and a convex shape in a sub scanning direction, which is a direction perpendicular to the main scanning direction, to reflect the light beam from the optical deflector, and a second curved mirror having one of a toric surface, and a cylindrical surface, which has no refractive power, or has a concave shape in the main scanning direction, and with a concave shape in the sub scanning direction to focus the light beam from the first curved mirror on the surface to be scanned.

2. The optical scanner according to claim 1, wherein the second curved mirror has the toric surface and refractive power in the sub scanning direction differs at a center portion and at a periphery portion with respect to the main scanning direction.

3. The optical scanner according to claim 1, wherein the second curved mirror has an optical axis and a barrel shaped toric surface formed by rotating a circular arc existing in a plane including the optical axis and parallel to the main scanning direction about a rotation symmetrical axis existing in a plane including the optical axis and parallel to the main scanning direction.

4. The optical scanner according to claim 1, wherein the second curved mirror has an optical axis and a barrel shaped toric surface formed by rotating a curved line having an expansion term of fourth order or higher existing in a plane including the optical axis and parallel to the main scanning direction about a rotation symmetrical axis existing in a plane including the optical axis and parallel to the main scanning direction.

5. The optial scanner according to claim 1, wherein the first curved mirror has the toric surface of which refractive power in the sub scanning direction differs at a center portion and at a periphery portion with respect to the main scanning direction.

6. The optical scanner according to claim 1, wherein the first curved mirror has a saddle shaped toric surface formed by rotating a circular arc existing in the plane including the optical axis and parallel to the main scanning direction about the rotation symmetrical axis existing in the plane including the optical axis and parallel to the main scanning direction.

7. The optical scanner according to claim 1, wherein the first curved mirror has a saddle shaped toric surface formed by rotating a curved line having an expansion term of fourth order or higher existing in the plane including the optical ax s and parallel to the main scanning direction about the rotation symmetrical axis existing in the plane including the optical axis and parallel to the main scanning direction.

8. The optical scanner according to claim 1, wherein the formula (4) is satisfied, $$0 \leq \frac{f_m}{f_{m2}} < 0.8 \tag{4}$$

wherein, $f_m$ (mm) denotes focal length of the second image formation optical system in the main scanning direction;

$fm_2$ denotes focal length of the second curved mirror in the main scanning direction.

9. The optical scanner according to claim 1, wherein the formula (5) is satisfied, $$0.4 < \frac{L}{f_m} < 1.1 \qquad (5)$$

wherein, $f_m$ (mm) denotes focal length of the second image formation optical system in the main scanning direction;

L (mm) denotes distance between the deflecting point of the optical deflector at the scanning center and the reflecting point of the first curved mirror.

10. The optical scanner according to claim 1, wherein the formula (6) is satisfied, $$0.2 < \frac{M}{f_m} < 1.4 \qquad (6)$$

wherein, $f_m$ (mm) denotes focal length of the second image formation optical system in the main scanning direction;

M (mm) denotes distance between the reflecting point of the second curved mirror at the scanning center and the surface to be scanned.

11. The optical scanner according to claim 1, wherein the formula (7) is satisfied, $$0.1 < \frac{D}{f_m} < 0.5 \qquad (7)$$

wherein, $f_m$ (mm) denotes focal length of the second image formation optical system in the main scanning direction;

D (mm) denotes distance between the reflecting point of the first curved mirror at the scanning center and the apex of the second curved mirror.

12. The optical scanner according to claim 1, wherein each element is arranged to have a tilt with respect to the sub scanning direction so that a light beam from the first image information optical system is incident obliquely with respect to the plane of the optical deflector including the normal of the deflecting plane and parallel to the main scanning direction, the reflected light beam from the optical deflector is incident obliquely with respect to the plane of the first curved mirror including the normal at its apex and parallel to the main scanning direction, and the reflected light beam from the first curved mirror is incident obliquely with respect to the plane of the second curved mirror including the normal at its apex and parallel to the main scanning direction, with the premise that the angle between the light beam reflected by the deflecting plane and the incident light beam to the deflecting plane from the first image formation optical system is positive, the angle between the light beam reflected by the first curved mirror and the incident light beam to the first curved mirror from the deflecting plane is negative, and the angle between the light beam reflected by the second curved mirror and the incident light beam to the second curved mirror from the first curved mirror is negative, with respect to the section in the sub scanning direction.

13. The optical scanner according to claim 1, wherein the light source unit comprises a wavelength changeable light source and a wavelength controlling portion.

14. The optical scanner according to claim 1, including means for integrating the first curved mirror and the second curved mirror of the second image formation optical system in one body.

15. An optical scanner comprising a light source unit having a plurality of light sources, an optical deflector to scan light beams from the light source unit, light mixing means disposed between the light source unit and the optical deflector for mixing the light beams from the plurality of light sources to form a mixed light beam, a first image formation optical system disposed between the light source unit and the optical deflector, and a second image formation optical system disposed between the optical deflector and a surface to be scanned, wherein the second image formation optical system comprises a first curved mirror having a toric surface with a concave shape in a main scanning direction, which is a direction a light beam is scanned in, and a convex shape in a sub scanning direction, which is a direction perpendicular to the main scanning direction, to reflect the mixed light beam from the optical deflector, and a second curved mirror having one of a toric surface, and a cylindrical surface, which has no refractive power, or has a concave shape in the main scanning direction and with a concave shape in the sub scanning direction to focus the mixed light beam from the first curved mirror on the surface to be scanned.

16. The optical scanner according to claim 15, including means for integrating the first curved mirror and the second curved mirror of the second image formation optical system in one body.

17. The optical scanner according to claim 15, further comprising light separating means for separating the mixed light beam, said light separating means being disposed between the optical deflector and the surface to be scanned.

18. The optical scanner according to claim 15, where the light beams emitted from the plurality of light sources of the light source unit have a plurality of wavelengths.

19. The optical scanner according the claim 15, wherein the light mixing means comprises one selected from the group consisting of a dichroic mirror and a half mirror.

20. The optical scanner according to claim 15, wherein the light separating means comprises one selected from the group consisting of a diffraction grating and a dichroic mirror.

21. An image forming apparatus using an optical scanner which comprises a light source unit, an optical deflector to scan a light beam from the light source unit, a first image formation optical system disposed between the light source unit and the optical deflector, and a second image formation optical system disposed between the optical deflector and a surface to be scanned, wherein the second image formation optical system comprises a first curved mirror having a toric surface with a concave shape in a main scanning direction, which is a direction a light beam is scanned in, and a convex shape in a sub scanning direction, which is a direction perpendicular to the main scanning direction, to reflect the light beam from the optical deflector, and a second curved mirror having one of a toric surface, and a cylindrical surface, which has no refractive power, or has a concave shape in the main scanning direction, and with a concave shape in the sub scanning direction to focus the light beam from the first curved mirror on the surface to be scanned.

22. An image forming apparatus using an optical scanner which comprises a light source unit having a plurality of light sources, an optical deflector to scan light beams from the light source unit, light mixing means disposed between the light source unit and the optical deflector for mixing the light beams from the plurality of light sources to form a mixed light beam, a first image formation optical system disposed between the light source unit and the optical deflector, and a second image formation optical system disposed between the optical deflector and the surface to be scanned, wherein the second image formation optical system comprises a first curved mirror having a toric surface with a concave shape in a main scanning direction, which is a direction a light beam is scanned in, and a convex shape in a scanning direction, which is a direction perpendicular to the main scanning direction, to reflect the mixed light beam from the optical deflector, and a second curved mirror having one of a toric surface, and a cylindrical surface, which has no refractive power, or has a concave shape in the main scanning direction and with a concave shape in the sub scanning direction to focus the mixed light beam from the first curved mirror on the surface to be scanned.

23. An image reading apparatus using an optical scanner which comprises a light source unit, an optical deflector to scan a light beam from the light source unit, a first image formation optical system disposed between the light source unit and the optical deflector, and a second image formation optical system disposed between the optical deflector and a surface to be scanned, wherein the second image formation optical system comprises a first curved mirror having a toric surface with a concave shape in a main scanning direction, which is a direction a light beam is scanned in, and a convex shape in a sub scanning direction, which is a direction perpendicular to the main scanning direction, to reflect the light beam from the optical deflector, and a second curved mirror having one of a toric surface, and a cylindrical surface, which has no a refractive power, or has a concave shape in the main scanning direction, and with a concave shape in the sub scanning direction to focus the light beam from the first curved mirror on the surface to be scanned.

24. An image reading apparatus using an optical scanner which comprises a light source unit having a plurality of light sources, an optical deflector to scan light beams from the light source unit, light mixing means disposed between the light source unit and the optical deflector for mixing the light beams from the plurality of light sources to form a mixed light beam, a first image formation optical system disposed between the light source unit and the optical deflector, and a second image formation optical system disposed between the optical deflector and a surface to be scanned, wherein the second image formation optical system comprises a first curved mirror having a toric surface with a concave shape in a main scanning direction, which is a direction a light beam is scanned in, and a convex shape in a sub scanning direction, which is a direction perpendicular to the main scanning direction, to reflect the mixed light beam from the optical deflector, and a second curved mirror having a toric surface or a cylindrical surface without a refractive power or with a concave shape in the main scanning direction and with a concave shape in the sub scanning direction to focus the mixed light beam from the first curved mirror on the surface to be scanned.

* * * * *